US012609927B1

(12) United States Patent
Gupta et al.

(10) Patent No.: US 12,609,927 B1
(45) Date of Patent: Apr. 21, 2026

(54) SECURE ATTESTATION BASED ACCESS TO REMOTE SERVICES

(71) Applicant: Motorola Mobility LLC, Chicago, IL (US)

(72) Inventors: Ranjeet Gupta, Aurora, IL (US); Andrew G. Wheeler, Arlington, IL (US); Bhavana Bhat, Bangalore (IN); Rafael Matuo, Sumaré (BR)

(73) Assignee: Motorola Mobility LLC, Chicago, IL (US)

( * ) Notice: Subject to any disclaimer, the term of this patent is extended or adjusted under 35 U.S.C. 154(b) by 47 days.

(21) Appl. No.: 18/956,169

(22) Filed: Nov. 22, 2024

(51) Int. Cl.
  *H04L 9/40* (2022.01)
  *G06V 40/16* (2022.01)

(52) U.S. Cl.
  CPC ........ *H04L 63/0861* (2013.01); *G06V 40/172* (2022.01); *H04L 63/10* (2013.01)

(58) Field of Classification Search
  CPC .... H04L 63/0861; H04L 63/10; G06V 40/172
  See application file for complete search history.

(56) References Cited

U.S. PATENT DOCUMENTS

|  |  |  |  |  |
|---|---|---|---|---|
| 9,881,295 | B1 * | 1/2018 | Buddhavarapu | ..... G06Q 20/322 |
| 10,219,154 | B1 * | 2/2019 | Hallock | .............. H04L 63/0876 |
| 10,270,771 | B1 * | 4/2019 | Tamanini | ............ H04L 63/0853 |
| 10,523,671 | B1 * | 12/2019 | Whitman | ............ H04L 63/0853 |
| 10,693,872 | B1 * | 6/2020 | Larson | ..................... G06F 21/32 |
| 10,826,703 | B1 * | 11/2020 | Shipley | ..................... G06F 9/54 |
| 10,957,136 | B1 * | 3/2021 | Kocher | ..................... G07C 9/23 |
| 11,093,207 | B1 * | 8/2021 | Lovelock | ................ G06F 3/147 |
| 11,308,198 | B1 * | 4/2022 | Wong | ..................... G06F 21/45 |
| 11,677,547 | B1 * | 6/2023 | McDonald | ............ H04L 9/3247 |
|  |  |  |  | 713/171 |
| 11,888,848 | B1 * | 1/2024 | Wright | ................ H04L 63/0428 |
| 11,979,389 | B1 * | 5/2024 | John Thomas | ....... H04W 12/03 |
| 12,238,091 | B1 * | 2/2025 | Mars | ..................... H04L 63/083 |
| 12,255,911 | B1 * | 3/2025 | Marshalkin | ......... H04L 63/0876 |
| 12,353,530 | B1 * | 7/2025 | Genner | .................. G06V 40/45 |
| 12,425,191 | B1 * | 9/2025 | Pecoraro | .................. H04L 9/50 |
| 12,526,279 | B1 * | 1/2026 | Perez | ...................... H04L 47/78 |
| 12,545,112 | B2 * | 2/2026 | Nagakari | ............... B60K 35/65 |
| 12,547,689 | B2 * | 2/2026 | Schei | ...................... G06F 21/32 |
| 12,549,373 | B2 * | 2/2026 | Kumar M | ............... G06F 21/32 |
| 12,549,537 | B2 * | 2/2026 | Kamal | .................... G06F 21/35 |

(Continued)

*Primary Examiner* — Aravind K Moorthy
(74) *Attorney, Agent, or Firm* — FIG. 1 Patents

(57) ABSTRACT

Techniques for secure attestation based access to remote services are described and are implementable to authorize requests for accessing user accounts. In implementations, an application processor of a mobile device obtains document evidence for authorizing a user of the mobile device to access one or more remote services through a network. A secure processor of the mobile device authenticates a user identity based on a plurality of images captured of a user face and attests a device identity based on one or more device identifiers of the mobile device. The secure processor sends, through the network, a request for access to the remote services based on the document evidence, at least one of the images, and the device identifiers. The application processor controls access through the network to the remote services based on a remote service reply to the request for access sent to the remote services.

20 Claims, 11 Drawing Sheets

(56) References Cited

U.S. PATENT DOCUMENTS

| | | | | |
|---|---|---|---|---|
| 2006/0262012 A1* | 11/2006 | Nishikata | G06F 1/1694 | 342/357.29 |
| 2007/0202894 A1* | 8/2007 | Dhebri | H04W 4/14 | 709/206 |
| 2008/0125179 A1* | 5/2008 | Hamada | H04M 1/72403 | 455/418 |
| 2008/0186220 A1* | 8/2008 | Shimbayashi | G08C 17/02 | 341/176 |
| 2009/0328028 A1* | 12/2009 | O'Rourke | G06F 8/65 | 717/173 |
| 2011/0265099 A1* | 10/2011 | Tobe | G06F 9/542 | 719/314 |
| 2011/0283291 A1* | 11/2011 | Tobe | G06F 9/461 | 718/104 |
| 2013/0063581 A1* | 3/2013 | Komatsu | G06V 40/50 | 348/E7.085 |
| 2014/0081572 A1* | 3/2014 | Poornachandran | H04W 4/02 | 701/537 |
| 2014/0237221 A1* | 8/2014 | Choi | G06F 9/44505 | 713/1 |
| 2014/0244805 A1* | 8/2014 | Lee | H04L 65/80 | 709/219 |
| 2015/0381575 A1* | 12/2015 | Bhargav-Spantzel | H04L 63/061 | 713/168 |
| 2016/0057619 A1* | 2/2016 | Lopez | G06Q 20/3829 | 380/247 |
| 2016/0125180 A1* | 5/2016 | Smith | H04L 9/0822 | 726/20 |
| 2016/0127359 A1* | 5/2016 | Minter | H04L 63/0861 | 726/6 |
| 2016/0162893 A1* | 6/2016 | Kamal | G06Q 20/34 | 705/44 |
| 2016/0191236 A1* | 6/2016 | Smirnoff | H04L 9/0822 | 713/171 |
| 2016/0224983 A1* | 8/2016 | Cash | H04L 63/0861 | |
| 2017/0019400 A1* | 1/2017 | Drolshagen | H04L 63/0861 | |
| 2017/0061441 A1* | 3/2017 | Kamal | G06Q 20/326 | |
| 2017/0094510 A1* | 3/2017 | Khosravi | H04L 63/04 | |
| 2017/0278159 A1* | 9/2017 | Chung | G06Q 30/0609 | |
| 2017/0289147 A1* | 10/2017 | Kyllonen | G06F 21/32 | |
| 2017/0331828 A1* | 11/2017 | Caldera | H04L 63/0807 | |
| 2017/0346946 A1* | 11/2017 | Liu | H04M 3/436 | |
| 2017/0351909 A1* | 12/2017 | Kaehler | G06V 40/171 | |
| 2018/0109944 A1* | 4/2018 | Kawakita | H04L 63/104 | |
| 2018/0124047 A1* | 5/2018 | Fisher | H04L 63/0861 | |
| 2018/0130114 A1* | 5/2018 | Hawkins | G06Q 30/0631 | |
| 2018/0189661 A1* | 7/2018 | Tatourian | H04W 4/38 | |
| 2018/0234420 A1* | 8/2018 | Mattes | G06Q 20/40145 | |
| 2018/0237137 A1* | 8/2018 | Tovey | G05D 1/0011 | |
| 2019/0069171 A1* | 2/2019 | Baldischweiler | H04L 63/0853 | |
| 2019/0089702 A1* | 3/2019 | Bhatt | G06Q 50/265 | |
| 2019/0124500 A1* | 4/2019 | Pievani | G06Q 50/26 | |
| 2019/0132309 A1* | 5/2019 | Wei | H04L 63/0823 | |
| 2019/0179954 A1* | 6/2019 | Mardikar | H04W 12/06 | |
| 2019/0197815 A1* | 6/2019 | Kamal | H04L 63/0861 | |
| 2019/0205517 A1* | 7/2019 | Moulin | G06F 21/53 | |
| 2019/0205518 A1* | 7/2019 | Moulin | G06V 40/172 | |
| 2019/0207986 A1* | 7/2019 | Mrowiec | H04L 63/302 | |
| 2019/0303676 A1* | 10/2019 | Costello | G07G 1/0009 | |
| 2019/0392196 A1* | 12/2019 | Sagonas | G06N 3/094 | |
| 2020/0042772 A1* | 2/2020 | Feng | G06F 18/22 | |
| 2020/0050746 A1* | 2/2020 | Kim | G06N 3/008 | |
| 2020/0153821 A1* | 5/2020 | Cao | H04L 63/0861 | |
| 2020/0177582 A1* | 6/2020 | Kitazawa | H04W 12/50 | |
| 2020/0272770 A1* | 8/2020 | Koyuncu | G06F 12/1441 | |
| 2020/0296132 A1* | 9/2020 | Lv | H04L 63/1483 | |
| 2020/0364489 A1* | 11/2020 | Ye | G06V 40/166 | |
| 2020/0396220 A1* | 12/2020 | McKegney | H04L 63/0884 | |
| 2021/0014062 A1* | 1/2021 | Bhattacharjee | H04L 63/126 | |
| 2021/0073385 A1* | 3/2021 | Götze | G06F 21/572 | |
| 2021/0073562 A1* | 3/2021 | Takeda | G06V 40/50 | |
| 2021/0075788 A1* | 3/2021 | Pasterk | H04L 9/3239 | |
| 2021/0089635 A1* | 3/2021 | Weeresinghe | G06Q 20/40145 | |
| 2021/0092117 A1* | 3/2021 | Zhang | G06F 21/44 | |
| 2021/0105271 A1* | 4/2021 | Nitturkar | H04W 12/06 | |
| 2021/0286979 A1* | 9/2021 | Zhuang | G06V 40/172 | |
| 2021/0314166 A1* | 10/2021 | Maheshwari | G06F 17/40 | |
| 2021/0342850 A1* | 11/2021 | Kumar | G06Q 20/3674 | |
| 2021/0383639 A1* | 12/2021 | Thomas | G07F 17/3239 | |
| 2021/0385355 A1* | 12/2021 | Hosoda | H04N 1/00413 | |
| 2022/0012473 A1* | 1/2022 | Miyake | G06V 10/82 | |
| 2022/0021528 A1* | 1/2022 | Dawson, III | H04L 9/3236 | |
| 2022/0092879 A1* | 3/2022 | Pearson | G06V 30/413 | |
| 2022/0178570 A1* | 6/2022 | Kitagawa | F24F 11/63 | |
| 2022/0255931 A1* | 8/2022 | Avetisov | H04L 9/3247 | |
| 2022/0277295 A1* | 9/2022 | Robinson-Morgan | G06Q 20/40145 | |
| 2022/0292917 A1* | 9/2022 | Shepherd | G07F 17/3241 | |
| 2023/0019417 A1* | 1/2023 | Mihara | G06Q 10/30 | |
| 2023/0021003 A1* | 1/2023 | Hayashida | G06V 40/173 | |
| 2023/0063590 A1* | 3/2023 | Luo | G06F 21/32 | |
| 2023/0128577 A1* | 4/2023 | Schei | G06F 21/32 | 726/18 |
| 2023/0142255 A1* | 5/2023 | Kajiki | H04L 9/3271 | 382/118 |
| 2023/0169481 A1* | 6/2023 | Berkowitz | G06F 21/31 | 705/16 |
| 2023/0206372 A1* | 6/2023 | Ordorica | H04L 63/0861 | 705/325 |
| 2023/0237862 A1* | 7/2023 | Kawase | G07C 9/37 | 340/5.53 |
| 2023/0262056 A1* | 8/2023 | Nagayama | H04L 63/102 | 726/7 |
| 2023/0269249 A1* | 8/2023 | Krishan | H04L 63/102 | 726/7 |
| 2023/0316790 A1* | 10/2023 | Bayer | G06V 10/751 | 382/118 |
| 2023/0339431 A1* | 10/2023 | Kuehner | B60R 25/305 | |
| 2023/0376941 A1* | 11/2023 | Jin | H04L 9/083 | |
| 2024/0070251 A1* | 2/2024 | Maizels | G06F 21/32 | |
| 2024/0086955 A1* | 3/2024 | Doumar | G06Q 10/10 | |
| 2024/0185635 A1* | 6/2024 | Kolla | G06V 40/171 | |
| 2024/0244048 A1* | 7/2024 | Traywick | H04L 9/3231 | |
| 2024/0331024 A1* | 10/2024 | Massie | G06F 21/32 | |
| 2024/0340285 A1* | 10/2024 | Vitug Weber | H04L 63/0853 | |
| 2024/0346119 A1* | 10/2024 | Betsko | G06F 21/32 | |
| 2024/0371510 A1* | 11/2024 | Aman | G16H 40/63 | |
| 2024/0372858 A1* | 11/2024 | Bales | H04W 12/42 | |
| 2024/0406167 A1* | 12/2024 | Pribble | G06F 21/31 | |
| 2024/0427868 A1* | 12/2024 | Batt | G06F 21/32 | |
| 2025/0029092 A1* | 1/2025 | Yang | G06Q 20/355 | |
| 2025/0033650 A1* | 1/2025 | Yoganathan | B60W 40/09 | |
| 2025/0069431 A1* | 2/2025 | Lee | G06V 30/41 | |
| 2025/0117606 A1* | 4/2025 | Kato | G10L 13/033 | |
| 2025/0124438 A1* | 4/2025 | Lindemann | G06F 21/316 | |
| 2025/0217952 A1* | 7/2025 | Huff | G06T 7/194 | |
| 2025/0218226 A1* | 7/2025 | Marshalkin | H04L 63/08 | |
| 2025/0240290 A1* | 7/2025 | Mondal | G06V 40/167 | |
| 2025/0315511 A1* | 10/2025 | Xia | G06F 21/32 | |
| 2025/0356057 A1* | 11/2025 | Pundak | G06F 21/64 | |
| 2026/0012349 A1* | 1/2026 | Kumar M | G06F 21/32 | |
| 2026/0023832 A1* | 1/2026 | Lowther | G06F 21/32 | |

* cited by examiner 102        300

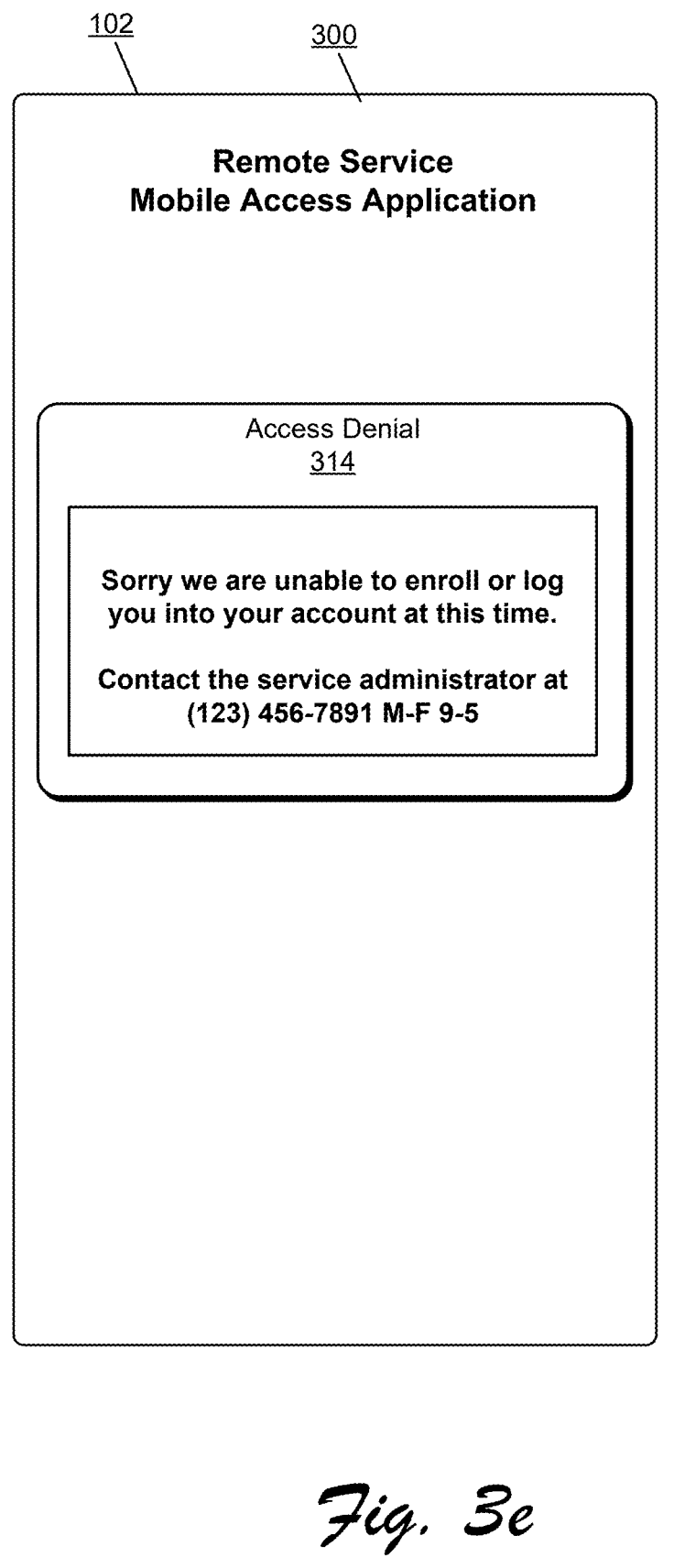

**Remote Service
Mobile Access Application**

Access Denial
314

**Sorry we are unable to enroll or log
you into your account at this time.**

**Contact the service administrator at
(123) 456-7891 M-F 9-5**

*Fig. 3e*

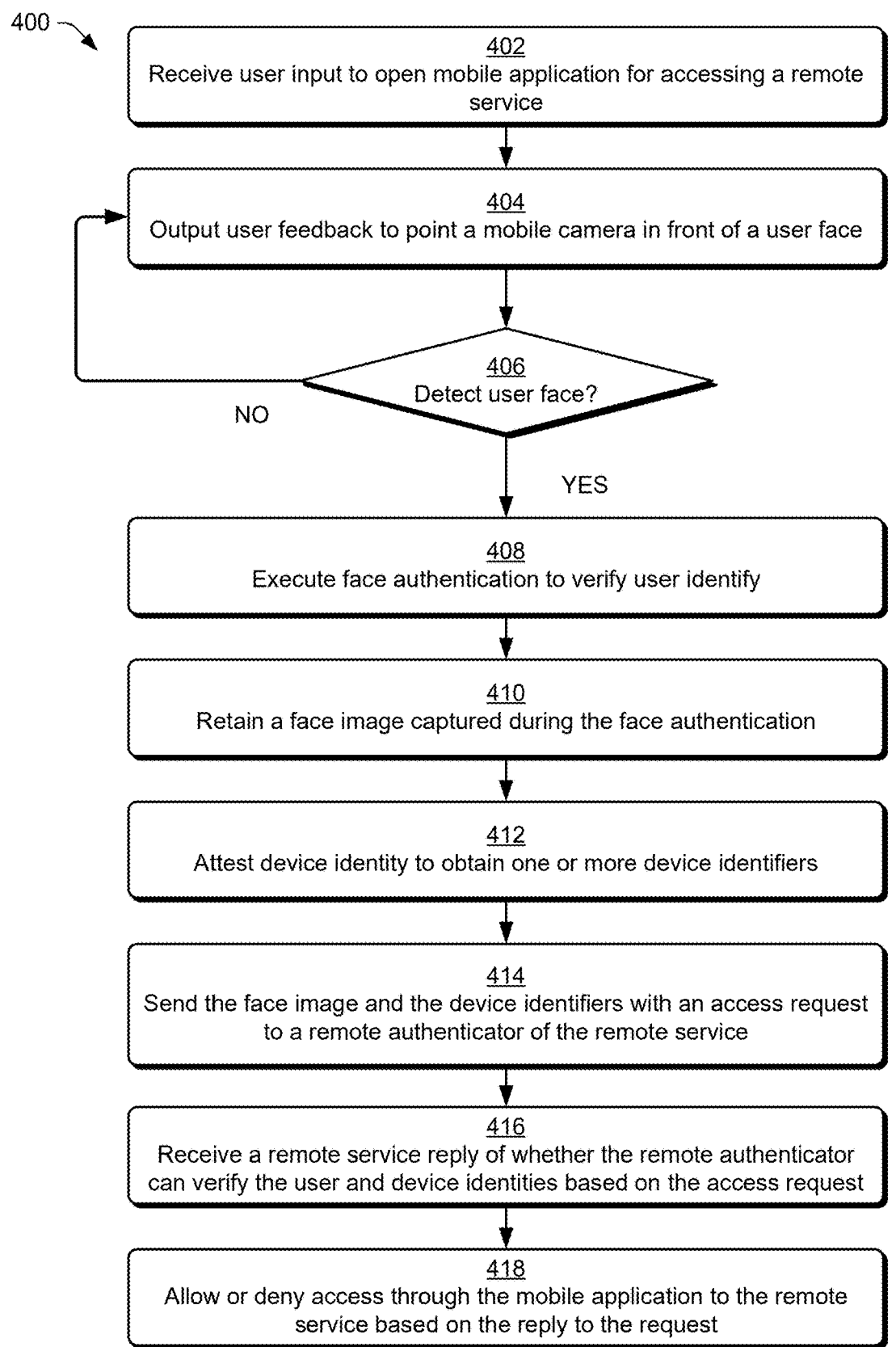

400

402
Receive user input to open mobile application for accessing a remote service 404
Output user feedback to point a mobile camera in front of a user face 406
Detect user face?

NO

YES

408
Execute face authentication to verify user identify

410
Retain a face image captured during the face authentication

412
Attest device identity to obtain one or more device identifiers

414
Send the face image and the device identifiers with an access request to a remote authenticator of the remote service 416
Receive a remote service reply of whether the remote authenticator can verify the user and device identities based on the access request 418
Allow or deny access through the mobile application to the remote service based on the reply to the request

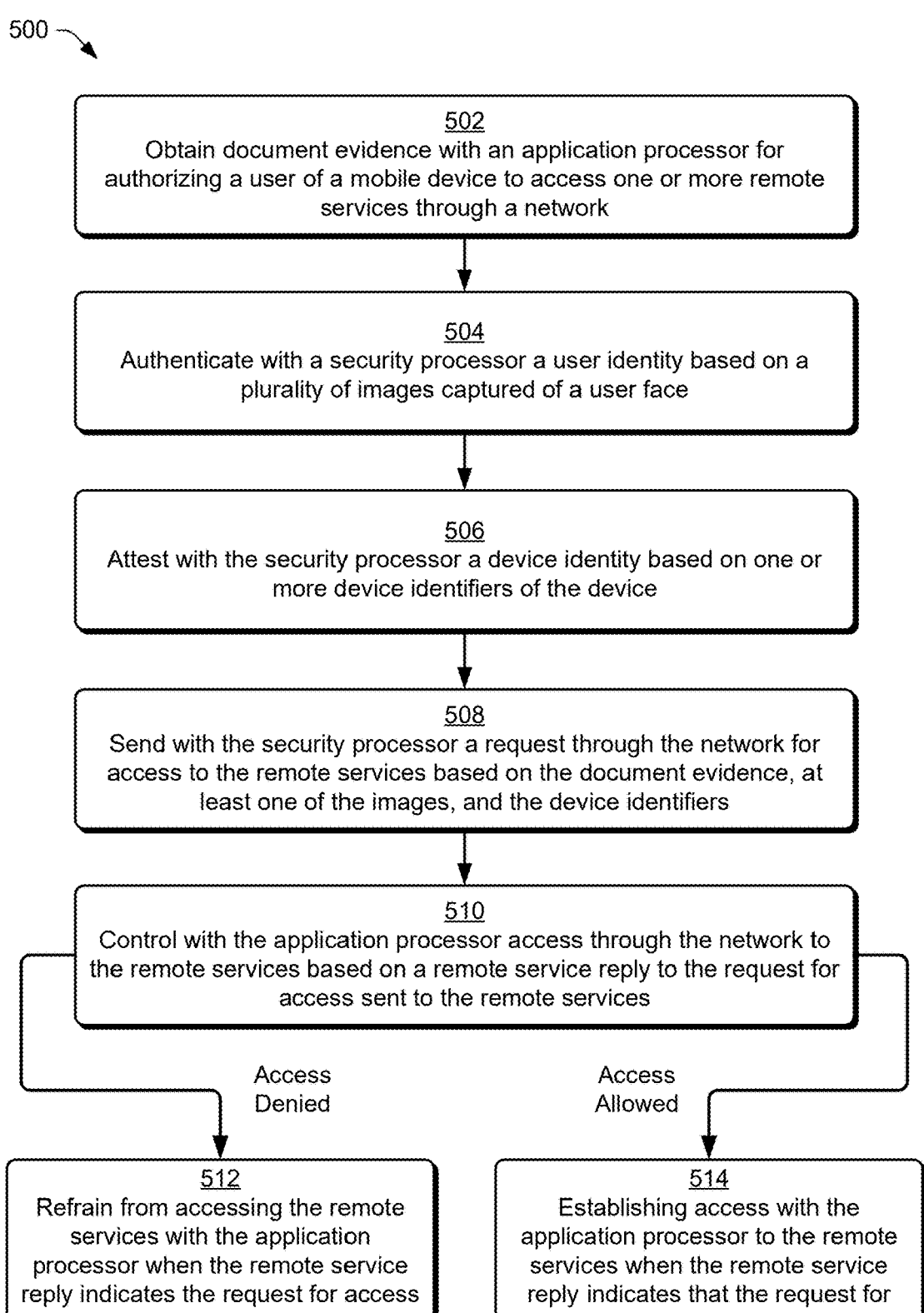

502
Obtain document evidence with an application processor for authorizing a user of a mobile device to access one or more remote services through a network

504
Authenticate with a security processor a user identity based on a plurality of images captured of a user face

506
Attest with the security processor a device identity based on one or more device identifiers of the device

508
Send with the security processor a request through the network for access to the remote services based on the document evidence, at least one of the images, and the device identifiers

510
Control with the application processor access through the network to the remote services based on a remote service reply to the request for access sent to the remote services Access Denied Access Allowed

512
Refrain from accessing the remote services with the application processor when the remote service reply indicates the request for access is denied

514
Establishing access with the application processor to the remote services when the remote service reply indicates that the request for access is allowed

*Fig. 5*

SECURE ATTESTATION BASED ACCESS TO REMOTE SERVICES

BACKGROUND

The use of remote or online network-based services has become common worldwide. For example, users can use a network-based finance application on a mobile device, such as a smartphone, to perform various financial transactions with an online financial service provider. While remote services offer convenience, managing account permissions and data security when implementing these services comes with challenges. For instance, a malicious user may gain unauthorized access to the financial service provider, take control of a user account, steal personal information, and initiate fraudulent transactions using various methods.

BRIEF DESCRIPTION OF THE DRAWINGS

Aspects of secure attestation based access to remote services are described with reference to the following Figures. The same numbers may be used throughout to reference similar features and components that are shown in the Figures. Further, identical numbers followed by different letters reference different instances of features and components described herein.

FIG. 3*e* depicts an example GUI in accordance with one or more implementations.

FIG. 4 illustrates a flow chart depicting an example method for secure attestation based access to remote services in accordance with one or more implementations.

FIG. 5 illustrates a flow chart depicting an example method for secure attestation based access to remote services in accordance with one or more implementations.

DETAILED DESCRIPTION

Figure 1:
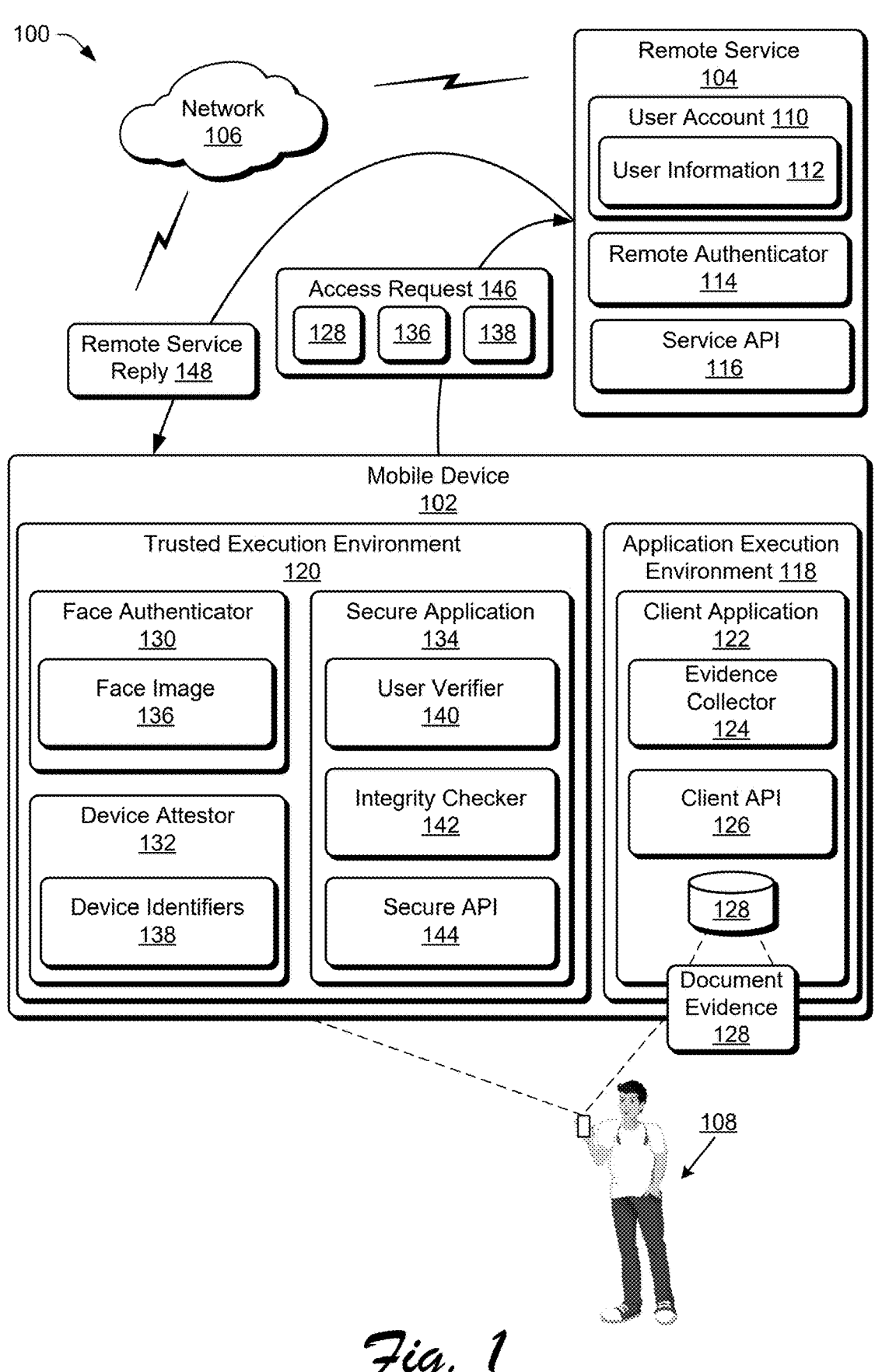
FIG. 1 illustrates an example environment in which aspects of secure attestation based access to remote services can be implemented.

Techniques for secure attestation based access to remote services are described and are implementable to authorize requests for accessing user accounts. For instance, the described techniques enable remote service providers (e.g., businesses, institutions, organizations) to securely validate remote service requests as being received from trusted devices and verifiably living users.

In at least one implementation, a client application executes on an application processor of a mobile device for accessing one or more remote services through a network.

The remote services can be any kind of online or cloud service that securely manages access to user accounts, for instance, to provide a personal or individually tailored experience. Non-limiting examples of the remote services include financial services, such as mobile payment and online banking, multimedia services for publishing and consuming digital content including music, movies, shows, and games, health and medical services (e.g., online prescription, telehealth), investment services to trade securities, pension and retirement services to plan and manage beneficiaries, academic services for attending an academic institution, and so forth.

The client application controls a user interface presented by the mobile device for interacting with the remote services. The remote services determine whether to allow or deny access via the user interface based on whether user and device identities can be authenticated both locally on the mobile device and remotely by the remote services. Access to the remote services may be based in part on document evidence collected by the client application, including images or digital copies of personal documents, such as paper documents (e.g., statements, notarized signatures), identification cards (e.g., passports, driver's licenses, proof of professional credentials), and the like. For example, the client application prompts a user of the mobile device to designate, via the user interface, one or more images of document evidence captured with a camera of the mobile device. During an account enrollment or setup, this information is stored by the remote system as user information for use during future remote authentications for enabling access to that user account.

In at least one example, the client application relies on a secure application executing on a secure processor of the mobile device to authenticate the user and device identities locally, and also enable remote authentication by the remote services. The secure application configures the secure processor to perform face authentication of the user interacting with the user interface and perform device attestation of the mobile device to authenticate the device identity, each from within a trusted execution environment of the mobile device. The secure application controls the camera to securely capture a plurality of images of a user face from within the trusted execution environment, which are inaccessible from the client application or other entities executing in the application execution environment. The plurality of images are analyzed from the secure processor to implement the face authentication and authenticate a user identity. The secure processor authenticates the user identity based on the plurality of images captured of the user face to verify the user of the mobile device is alive and the authentication process is not being spoofed by an external artifact (e.g., a physical photo of the user face of the user, a face image presented on another mobile device or external screen). The secure application invokes a device attestation process (e.g., as part of a bootloader, operating system, or mobile system service) to authenticate a device identity within the trusted execution environment. The secure processor attests the device identity based on one or more device identifiers, which remain shielded from access via the application execution environment.

This information is used in combination with the document evidence for authenticating the user identity and the device identity remotely at the remote services. The secure application, for instance, collects and preserves the document evidence with the device identifiers and at least one image from the plurality of images captured during the face authentication for sending to the remote services. Once the user and device identities are authenticated on the secure processor, the secure application sends a request for remote service access, along with information usable by the remote services to remotely authenticate the user and device identities. For example, a request for access to the remote services based on the document evidence, at least one of the images, and the device identifiers is sent by the secure application through the network and to the remote services.

The remote services receive the request sent by the mobile device and extract the user and device identity information from the request. A remote authenticator, for example, executes with the remote services to execute a remote device attestation and user face authentication process. The remote services verify the request indicates local authentication was successful on the mobile device, and then performs a remote user authentication process to confirm the face image and the document evidence received matches the user information stored by the remote services when the user enrolled or the account was set up. The remote services then performs a remote attestation process to confirm the mobile device trustworthiness. The remote services reply to the request for access by sending information usable by the client application to control the user interface to allow or prevent access to the remote services. As one example, when the identities cannot be authenticated either locally or remotely, the remote service reply indicates the client application is denied access to the remote services and the user interface presents a message indicating authentication failed. When the identities are authenticated both locally and remotely, the client application is granted access based on the remote service reply. An account homepage is presented in the user interface to enable the remote services to be accessible from the mobile device.

Accordingly, techniques described herein enable secure attestation based access to remote services. In implementations, the remote services are implemented as cloud or online banking services. For instance, the client application is a mobile banking application used to access the banking services. Deciding whether to allow or deny access to the banking services includes implementing multiple levels of security functions. Secure face identification is implemented in the trusted execution environment to securely determine with a high degree of accuracy whether a user of the mobile device is a living person, and whether that user's face corresponds to an authorized user of the mobile device. Secure device attestation processes are implemented in the trusted execution environment to enable the secure application to verify the device identity is not compromised and is representative of a trusted device experience. The remote services repeat aspects of the local authentication to remotely verify the user and device identity using the information included in an access request. The remote services implement remote facial identification based on an image taken during the local facial identification. The remote services receive the device identifiers output during the local device attestation process and perform a corresponding remote device attestation process to double-check the trustworthiness of the mobile device. By enabling local and remote authentication of user and device identity, the described techniques enhance the security of the remote services to ensure authorized mobile device users are allowed to interact with the banking services associated with corresponding user accounts. Further, user burden can be reduced by performing such authentication processes automatically while reducing user interaction to initiate and manage the authentication processes. Enhanced security is achieved efficiently without introducing complexity (e.g., without adding specialized hardware or complex software-based routines) to authenticate user and device identities, and thus the described techniques can improve the operation of computing devices and data networks that connect remote services.

While features and concepts of secure attestation based access to remote services can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of authentication for data transaction messages can be implemented. The environment 100 includes a mobile device 102 and a remote service 104, which are communicatively coupled through a network 106. Various entities of the environment 100 can be connected and communicate via the network 106. The network 106, for example, can represent a combination of wired and wireless networks via which the mobile device 102 and the remote service 104 can participate in various types of communication, such as wired and/or wireless data communication. The network 106 facilitates data exchanges between services, applications, and threads executing locally on the mobile device 102 and remotely as part of the remote service 104.

The mobile device 102 represents any device that can be used by a user 108 and perform operations in response to user inputs from the user 108. For example, the user inputs are detectable by the mobile device 102 as tactile, audible, and visual inputs. The mobile device 102 can represent any type of an electronic and/or computing device implemented with various components, such as a processor system and memory, as well as any number and combination of different components as further described with reference to the example device 600 shown in FIG. 6.

In implementations, the remote service 104 represents a network-based service that is accessible by the mobile device 102 to perform different remote functions or remote operations implemented by the remote service 104. The remote service 104 can be implemented by various entities, such as a banking entity, a digital payment service, a multimedia service, such as a music, video, or game service, an enterprise entity, a trading entity, a data storage and/or management entity, and/or combinations thereof. The user 108, for instance, can interact with the mobile device 102 to access the remote service 104 to perform different finance transactions, such as to transfer value amounts (e.g., monetary values) for different purposes, e.g., to purchase goods and/or services. The user 108 may also use the mobile device 102 to monitor a user account 110 that is associated with the user 108 and the mobile device 102 by accessing user information 112. The user information 112 may include any data that is associated with tailoring the remote service 104 for the user account 110 such as a user name and other personal information (e.g., home address, account balance, account identifiers, service interaction history), permissions for accessing different tiers of the remote service 104 (e.g., customer permission, internal permission, administrator permission). The user information 112 may preserve user and mobile device identities used to remotely authenticate the user 108 and the mobile device 102 when requesting access to the user account 110 and the remote service 104 through the network 106.

In at least one example, access to the user account 110 and the remote service 104 is managed by a remote authenticator 114, which receives data from the mobile device 102 through a service application program interface (API), which is labeled as a service API 116. The remote authenticator 114 executes operations that consider whether a request for the remote service 104 received at the service API 116 is to be allowed or denied access to the remote service 104 based on information included in the request, as well as the user information 112.

In various implementations, the mobile device 102 includes at least one first processor designated as an application processor (e.g., a program processor, a main processor, a central processing unit) that executes an operating system of the mobile device 102 and implements an application execution environment 118 to support execution of a plurality of applications loaded on the mobile device 102. The mobile device 102 also includes at least one second processor designated as a secure processor (e.g., a secure processor, a program secure processor, a specialized processor, a dedicated security chip) that implements various low-level services executed to initialize the mobile device 102, boot the operating system, and implement various secure functions that support execution of the applications executed by the first processor within the application execution environment 118. The secure processor implements a trusted execution environment 120 to execute the various secure function in isolation from the application execution environment 118. In at least one example, the first and second processors utilize a shared memory where each processor is restricted to accessing a corresponding address space in the shared memory. In variations, the first and second processors utilize different memories to maintain isolation between the application execution environment 118 and the trusted execution environment 120 when each processor is executing and processing different instructions and data.

A client application 122, for instance, executes within the application execution environment 118 to access the remote service 104. The client application 122 is supported by an evidence collector 124, a client API 126, and data storage to preserve document evidence 128. For example, the client application 122 controls a user interface from which the user 108 provides user inputs to interact with the remote service 104 from a connection through the network 106 with the mobile device 102. The user interface may grant access to the user account 110 and the user information 112 to allow the user 108 to experience the remote service 104 based on the document evidence 128 collected by the evidence collector 124 and shared through the client API 126.

The client application 122, the evidence collector 124, the client API 126, and the data storage for the document evidence 128 may be implemented as a module that includes independent processing, memory, and/or logic components functioning as a computing and/or electronic device integrated with the mobile device. Alternatively or in addition, the client application 122 and components thereof can be implemented as a software application or software module, such as integrated with an operating system as computer-executable instructions that are executable with the application processor of the mobile device 102. As a software application or module, the client application 122 and supporting components may also be implemented as one or more artificial intelligence algorithms and/or machine learning algorithms. Alternatively or in addition, the client application 122 and related parts may be implemented in firmware and/or at least partially in computer hardware. For example, at least part of the client application 122 is executable by the application processor, and/or at least part of the client application 122 is implemented in logic circuitry.

The evidence collector 124 obtains scans, images, digital copies, blockchain tokens and artifacts, including images or digital copies of personal documents, such as paper documents (e.g., statements, notarized signatures), identification cards (e.g., passports, driver's licenses, proof of professional credentials), and the like. This information is stored by the evidence collector 124 as document evidence 128, which to be used to enroll the user 108 or enable access to the user account 110. The document evidence 128 may include one or more document images accessible from the application execution environment 118 and the trusted execution environment 120. As made clear below, access to the remote service 104 is based in part on whether the document evidence 128 collected by the client application 122 satisfies a local security check performed within the trusted execution environment 120 and a remote security check performed by the remote service 104.

To perform the local security check on behalf of the client application 122, the trusted execution environment 120 includes a face authenticator 130, a device attestor 132, and a secure application 134. The secure application 134 is supported by the face authenticator 130 and the device attestor 132 to locally authenticate the user 108 and the mobile device 102 as a condition for the client application 122 to receive from the remote authenticator 114 access to the remote service 104.

The face authenticator 130, the device attestor 132, the secure application 134, and components thereof, may be implemented as a module that includes independent processing, memory, and/or logic components functioning as a computing and/or electronic device integrated with the mobile device. In at least one implementation, the secure application 134 and the client application 122 are part of a same module, which is partially executed in the application execution environment 118 and partially executed in the trusted execution environment 120. Alternatively or in addition, the face authenticator 130, the device attestor 132, the secure application 134, and components thereof, can be implemented as a software application or software module, such as integrated with an operating system as computer-executable instructions that are executable with the secure processor of the mobile device 102. As a software application or module, the secure application 134, and supporting components may also be implemented as one or more artificial intelligence algorithms and/or machine learning algorithms. Alternatively or in addition, the secure application 134, and related parts may be implemented in firmware and/or at least partially in computer hardware. For example, at least part of the secure application 134 is executable by the secure processor, and/or at least part of the secure application 134 is implemented in logic circuitry of the trusted execution environment 120.

The face authenticator 130 is a system integrated in the trusted execution environment 120 to implement facial recognition technology and enhance the security of the mobile device 102. The face authenticator 130 may be used to unlock the mobile device 102 or accessible as a system service for unlocking device applications and device features. The face authenticator 130 authenticates a user identity based on a plurality of images of a user face captured from the trusted execution environment 120. A camera of the mobile device 102 is controlled by the face authenticator 130 to capture multiple images (i.e., a plurality of images) of a user face of the user 108. The user 108, for instance, holds the mobile device 102 to position the user face in a field of view of a camera lens. Because the plurality of images are captured within the trusted execution environment 120, the individual images are not accessible from the application execution environment 118, which enhances security of the mobile device 102 and the face authenticator 130. From the plurality of images captured by the face authenticator 130, the face authenticator 130 selects one or more of the images to be a face image 136. The face image 136 is processed using the facial recognition techniques to verify the identity of the user 108. If the face image 136 matches a securely stored reference data, the user 108 is authenticated. This process ensures that only the authorized user can access the mobile device 102 and various features, including access to the user account 110 associated with the user 108, or provide a secure and convenient way to unlock and use the mobile device 102.

The device attestor 132 is a system integrated in the trusted execution environment 120 to verify an identity and integrity of the mobile device 102 through a process known as device attestation. The device attestor 132 may be used to securely boot the mobile device 102 by verifying integrity of the various hardware and software layers of firmware and operating system. The device attestor 132 attests a device identity based on one or more device identifiers 138 of the mobile device 102. The device attestation process involves the device attestor 132 examining various aspects of the mobile device 102, such as the firmware, the operating system, and the security settings, to confirm the aspects are in a known and trusted state. During device attestation, the device attestor 132 performs local checks to ensure that a hardware and software configuration of the mobile device 102 have not been tampered with based on local truth data securely maintained in the trusted execution environment 120. Next, the device attestor 132 generates and outputs device identifiers 138. The device identifiers 138 may include unique hardware identifiers, cryptographic keys, and software version information describing the hardware and software configuration of the mobile device 102. Because the device identifiers 138 are obtained within the trusted execution environment 120, the device identifiers 138 are not accessible from the application execution environment 118, which enhances security of the mobile device 102 and the device attestor 132.

The secure application 134 executes in the trusted execution environment 120 to assist the client application 122 in establishing a secure connection to the remote service 104. The secure application 134 is part of the client application 122 (e.g., compiled as separate executable units to serve different purposes) in various implementations. The secure application 134 may be implemented separate from the client application 122, e.g., as a security thread invoked by the client application 122 during execution. A local one-way communication channel may exist between the secure application 134 and the client application 122 to enable the secure application 134 to receive commands and data (e.g., the document evidence 128) from the client application 122. For example, after collecting the document evidence 128, the client application 122 sends the document evidence 128 to the secure application 134 with a command to invoke the secure application 134 to establish a connection with the mobile device 102 on behalf of the user 108.

A user verifier 140 of the secure application 134 obtains the face image 136 along with an indication of whether the user 108 passed the facial recognition tests performed by the face authenticator 130. An integrity checker 142 of the secure application 134 retrieves the device identifiers 138 and an indication confirming whether the mobile device 102 passed the device attestation process performed by the device attestor 132. When the face authentication and device attestation are successful and the identities of the user 108 and the mobile device 102 are verified, a secure API 144 of the secure application 134 collects the document evidence 128 received from the client application 122, and the face image 136 and the device identifiers 138 to generate an access request 146. The secure API 144, for instance, packages the document evidence, the face image 136, and the device identifiers 138 into a network communication to be sent through the network 106 as the access request 146.

The document evidence 128, the face image 136, and the device identifiers 138 are communicated in the access request 146 to the remote service 104 to establish a connection with the client application 122 on behalf of the user 108. For example, the secure application 134 uses the secure API 144 to send the access request 146 to the remote service 104, to enable the remote authenticator 114 to authorize or deny access to the user account 110 and the remote service 104 based on the document evidence 128, the face image 136, and the device identifiers 138. Because the access request 146 is generated within the trusted execution environment 120, the request for access to the remote service 104 is not accessible from the application execution environment 118, which further enhances security in accessing the remote service 104.

After user and device identity are authenticated locally by the secure application 134, the remote authenticator 114 receives the access request 146 through the service API 116. The remote authenticator 114 uses the document evidence 128 and the face image 136 to independently verify the user identity of the user 108, ensuring that the user 108 is a living person associated with the user account 110. For example, the document evidence 128 and/or the face image 136 are compared to securely stored reference versions maintained in the user information 112. The remote authenticator 114 uses the device identifiers 138 to perform another attestation process to independently verify the device identity and integrity of the mobile device 102, ensuring that the mobile device 102 is secure and trustworthy. This comprehensive verification process performed by the remote authenticator 114 helps maintain the security and reliability of the remote service 104, allowing the remote service 104 to authenticate the access request 146 with confidence.

A result of the verification process performed by the remote authenticator 114 includes a remote service reply 148 output to the client API 126 of the client application 122. The remote service reply 148 includes information for the client application 122 to establish a connection through the network 106, to communicate with the remote service 104 when the remote authenticator 114 authenticates the user 108 and the mobile device 102, and authorizes access to the user account 110. When the remote authenticator 114 is unable to authenticate the user 108 or the mobile device 102, the remote authenticator 114 denies access to the user account 110, and includes an indication of the service denial in the remote service reply 148 to prevent the client application 122 from establishing access to the remote service 104.

The client application 122 controls access to the remote service 104 based on the remote service reply 148 to the access request 146 sent to the remote authenticator 114 via the service API 116. For example, the client application 122 controls a user interface from which the user 108 provides user inputs to interact with the remote service 104 from a connection through the network 106 with the mobile device 102. Based on information included in the remote service reply 148, the user interface may grant access to the user account 110 and the user information 112 to allow the user 108 to experience the remote service 104 based on the document evidence 128 collected by the evidence collector 124 and shared through the client API 126. Conversely, the user interface may deny access to the user account 110 and the user information 112 based on the information included in the remote service reply 148, including to lock down access from the client application 122 to the user account 110 for preventing the user 108 and the mobile device 102 from accessing the user information 112.

The mobile device 102 and the remote service 104 can be implemented in various ways and include various functionality, examples of which care discussed below with reference to the example device 600 of FIG. 6. Having discussed an example environment in which the disclosed techniques can be performed, consider now an example system, scenarios, and implementation details for implementing the disclosed techniques.

Figure 2:
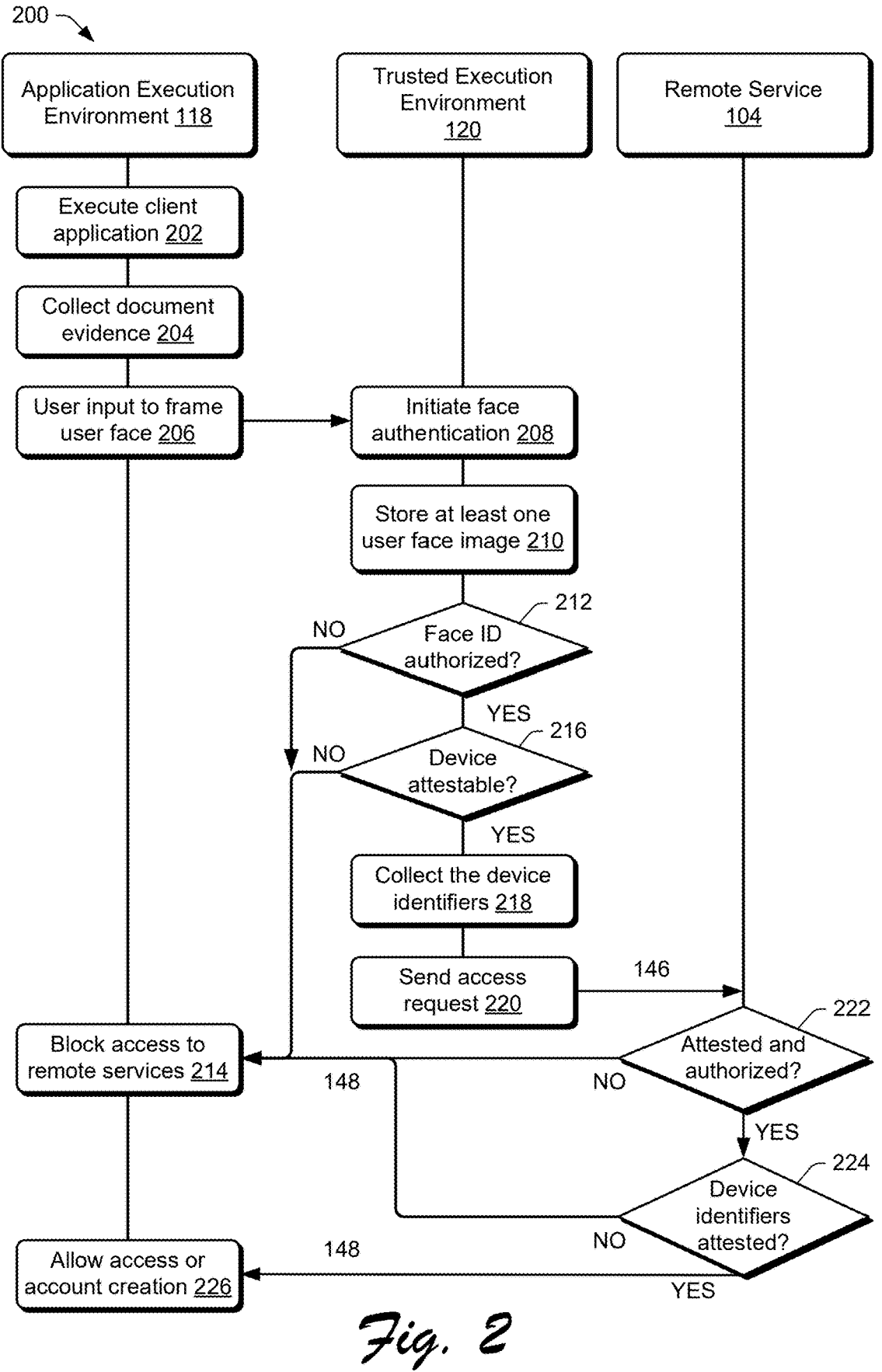
FIG. 2 depicts a timing diagram of operations executed by an example system for secure attestation based access to remote services with one or more implementations.

FIG. 2 depicts a timing diagram 200 of operations executed by an example system for secure attestation based access to remote services with one or more implementations. For example, the timing diagram 200 is described in the context of the environment 100 including operations performed locally on the mobile device 102, either within the application execution environment 118 or the trusted execution environment 120, or remotely performed, off the mobile device 102, by the remote service 104.

A series of operations 202 through 226 are executed by the mobile device 102 and the remote service 104 over a period of time to illustrate an example of establishing secure attestation based access through the network 106. The period of time flows chronologically from top to bottom of the drawing. The operations 202, 204, 206, 214, and 216 are depicted on a left side of the timing diagram 200 to represent execution within the application execution environment 118 of the mobile device 102. The operations 222 and 224 are depicted on a right side of the timing diagram 200 to represent execution by the remote service 104. Lastly, as depicted in the middle of the timing diagram 200, the operations 208, 210, 212, 216, 218, and 220 are executed within the trusted execution environment 120.

Executing the operations 208, 210, 212, 216, 218, and 220 in the trusted execution environment 120 shields corresponding results (e.g., decisions, data) from the application execution environment 118. The isolation enhances security of establishing secure attestation based access to the remote service 104. In addition to enhancing security, executing at least some of the operations 208, 210, 212, 216, 218, and 220 within the trusted execution environment 120 reduces implementation complexity. Existing facial recognition and device attestation components (e.g., to unlock the mobile device 102 and implement a boot process) may already be implemented within the trusted execution environment 120 on the mobile device 102. These existing components may be reusable as the face authenticator 130 and the device attestor 132 accessed from the secure application 134 to establish the secure attestation based access to the remote service 104, which reduces complexity of the operations 208, 210, 212, 216, 218, and 220 managed by the secure application 134.

At the start of the timing diagram 200, the mobile device 102 performs the operation 202 by executing the client application 122 in the trusted execution environment 120. The evidence collector 124 performs the operation 204 to collect the document evidence 128 through prompting the user 108 to designate existing digital documents and artifacts to prove user identity, or capture digital images of physical documents and artifacts. Next, the client application 122 prompts the user 108 to hold a camera of the mobile device 102 for capturing the face of the user 108. To perform the operation 206, the client application 122 detects when the user input provided by the user 108 is framing the user face. This detection invokes execution of the secure application 134 in the trusted execution environment 120.

The secure application 134 communicates with the face authenticator 130 to perform the operation 208 for initiating face authentication of the user face captured with the camera. During the face authentication, the operation 210 is performed by the secure application 134, which sets aside (e.g., saves, stores, preserves) at least one of the images captured by the face authenticator 130. For example, the face image 136 is maintained by the secure application 134 for use during remote authentication.

The operation 212 is implemented by the secure application 134 to check whether the face authentication successfully verified the user 108, or whether the face authentication was unsuccessful. Based on an indication of the results received from the face authenticator 130, the secure application 134 either executes the operation 216, or triggers the client application 122 to block access to the remote service 104 by executing the operation 214.

When face authentication is successful, the secure application 134 communicates with the device attestor 132 to verify device identity. The operation 216 is implemented by the secure application 134 to check whether the device attestation successfully verified the mobile device 102, or whether the device attestation failed. Based on an indication of the results received from the device attestor 132, the secure application 134 either executes the operation 218, or triggers the client application 122 to block access to the remote service 104 by executing the operation 214.

The next two operations 218 and 220 are performed in the trusted execution environment 120, which cause the secure application 134 to collect the device identifiers 138 output from the device attestor 132. The secure application 134 then packages the device attestor 132, the face image 136, and the document evidence 128 together in the access request 146, which is sent from the secure API 144 through the network 106 to the remote authenticator 114.

The remote service 104 implements the operation 222 by authenticating the information included in the access request 146. The remote authenticator 114, for instance, compares the user information 112 to corresponding reference information provided with the face image 136 and the document evidence 128 to verify the user identity. The operation 222 checks whether the user identity is authenticated and moves to the operation 224 is verified and moves to the operation 214 if not successfully verified. Unsuccessful user verification triggers output of the remote service reply 148 to cause the client application 122 to block access to the remote service 104 by executing the operation 214.

The remote service 104 implements the operation 224 by further authenticating the information included in the access request 146 to check whether the device identifiers 138 match previous device identifiers stored in the user information 112, or device identifiers generated by the remote authenticator 114 in response to the access request 146. If the remote authenticator 114 can verify that the mobile device 102 is trustworthy, the remote service reply 148 is sent to the client application 122 to perform the operation 226. The client application 122 performs the operation 226 by using information contained in the remote service reply 148 to establish access to the remote service 104 when the remote service reply 148 indicates that the request for access request described in the access request 146 is allowed. If the remote authenticator 114 cannot verify that the mobile device 102 is trustworthy, the remote service reply 148 is sent to the client application 122 to perform the operation 214. The client application 122 performs the operation 214 by refraining from establishing access to the remote service 104 when the remote service reply 148 indicates that the request for access request described in the access request 146 is denied.

FIG. 3a through FIG. 3f each depict an example graphical user interface (GUI) in accordance with one or more implementations. Each depiction of the GUI is labeled as GUI 300. The GUI 300, for instance, can be implemented on the mobile device 102 associated with the user 108 and incorporates attributes of the environment 100 and the examples introduced above. The client application 122 controls the GUI 300 to provide access to the remote service 104. When the client application 122 is open in the application execution environment 118, the client application 122 causes a touchscreen on the mobile device 102 to present the GUI 300 and receive user inputs as the user 108 interacts with the GUI 300.

Figure 3A:
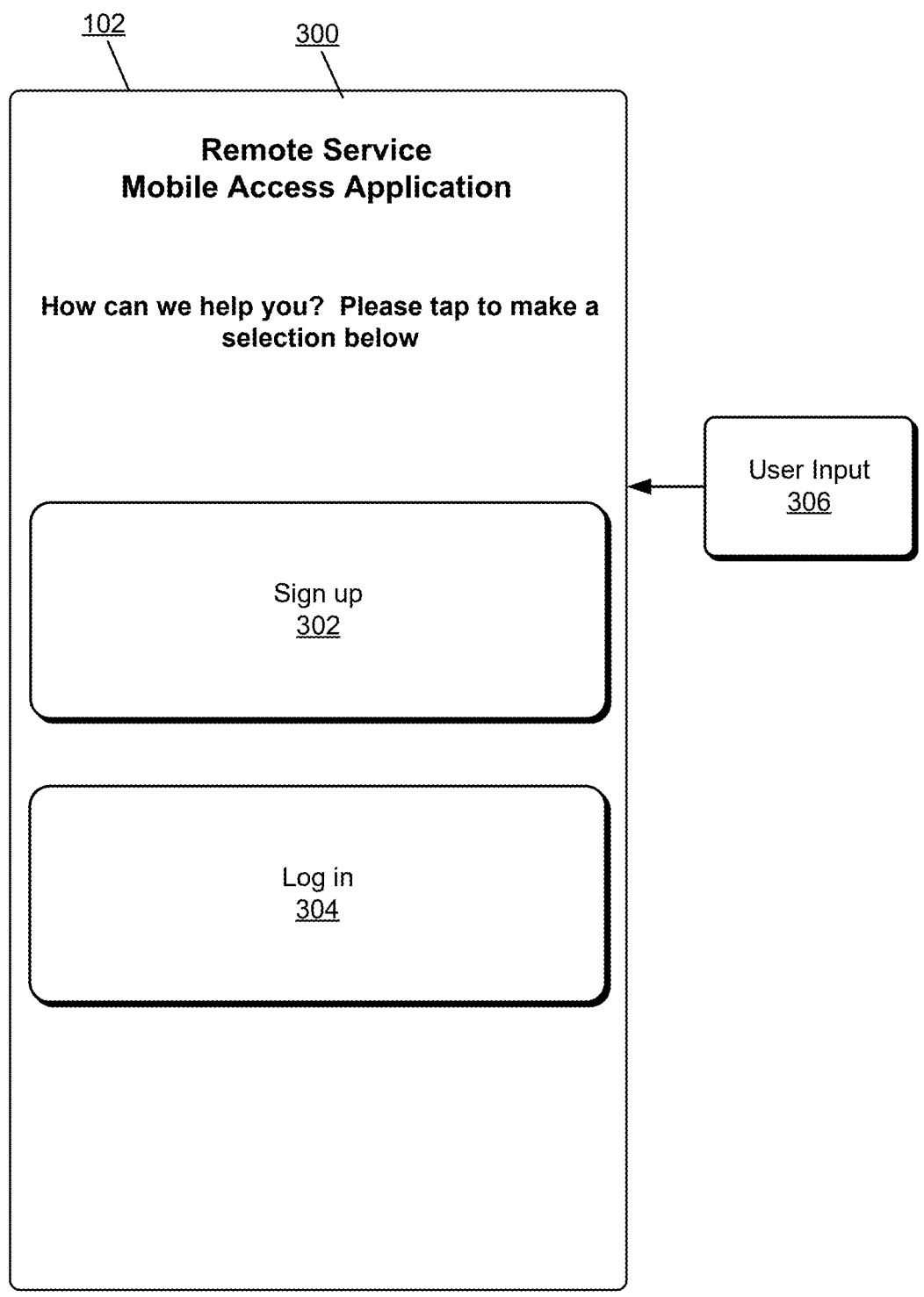
FIG. 3*a* depicts an example graphical user interface (GUI) in accordance with one or more implementations.

FIG. 3a depicts aspects of the example GUI 300 in accordance with one or more implementations. The GUI 300, for instance, can be implemented on the mobile device 102 and can be generated via the client application 122, the secure application 134, etc. The GUI 300 depicted in FIG. 3a presents selectable elements 302 and 304 to either sign up or log into the remote service 104. The mobile device 102 receives a user input 306 at the GUI 300 to establish remote access to the remote service 104 in accordance with the user selection.

Figure 3B:
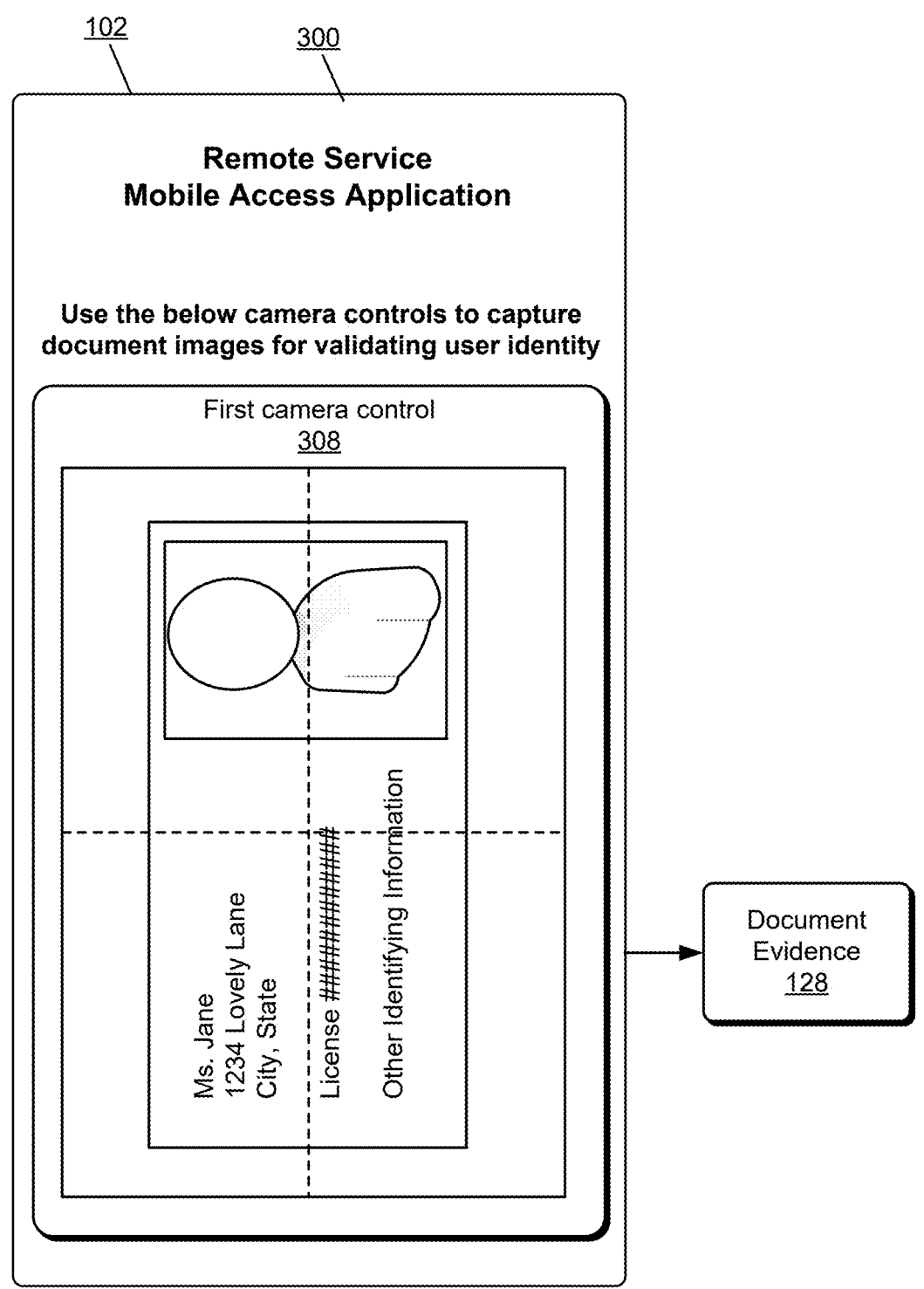
FIG. 3*b* depicts an example GUI in accordance with one or more implementations.

FIG. 3b depicts aspects of the example GUI 300 in accordance with one or more implementations. The GUI 300 depicted in FIG. 3b presents a first camera control 308 to enable scanning of identifying documents (e.g., a driver license) to collect the document evidence 128. The client application 122 obtains the document evidence 128 based on user interactions with the first camera control 308. The client application 122 controls a camera of the mobile device 102 (e.g., a user away facing camera) from the application execution environment 118 to obtain images corresponding to the document evidence 128.

Figure 3C:
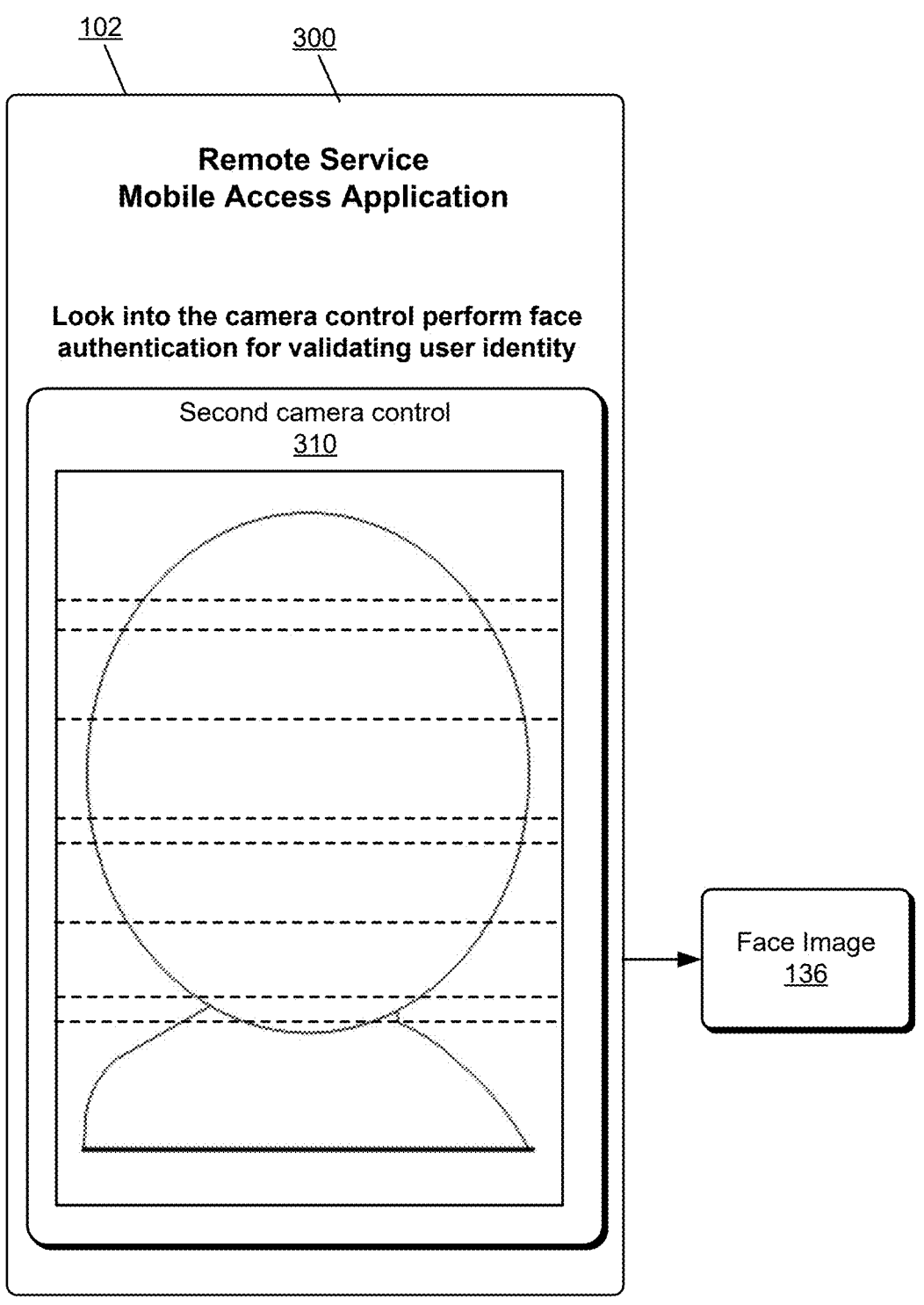
FIG. 3*c* depicts an example GUI in accordance with one or more implementations.

FIG. 3c depicts aspects of the example GUI 300 in accordance with one or more implementations. The GUI 300 depicted in FIG. 3c presents a second camera control 310 to enable face authentication of the user 108, including to execute the face authenticator 130 to collect the face image 136. The secure application 134 obtains the face image 136 based on user interactions with the second camera control 310. The secure application 134 controls a camera of the mobile device 102 (e.g., a user facing camera) from the trusted execution environment 120 to capture a plurality of images to perform face authentication including to obtain the face image 136.

Figure 3D:
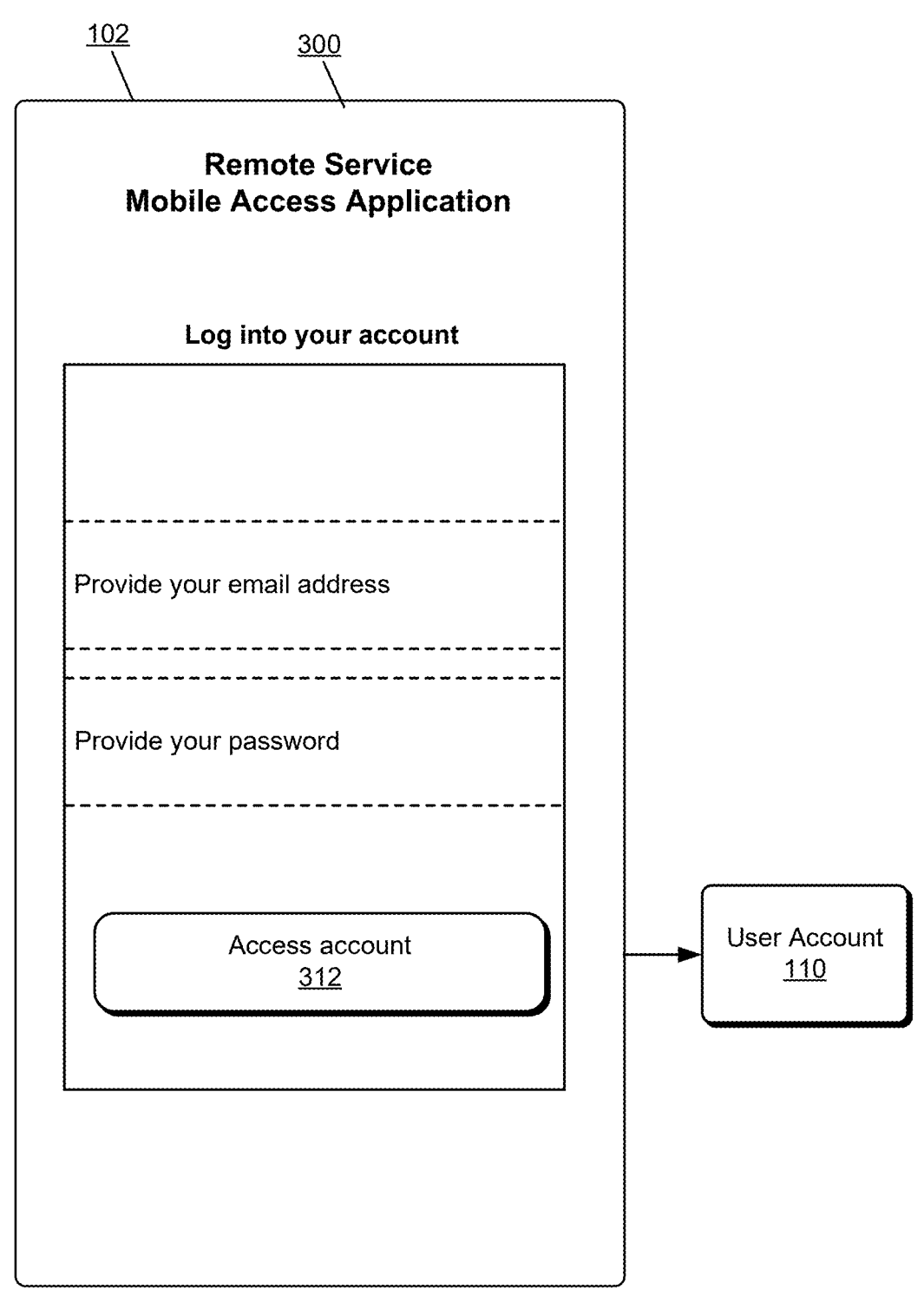
FIG. 3*d* depicts an example GUI in accordance with one or more implementations.

FIG. 3d depicts aspects of the example GUI 300 in accordance with one or more implementations. The GUI 300 depicted in FIG. 3d presents an account login page including a selectable element 312 to log into an account through the remote service 104 when the remote service reply 148 indicates that the user identity and device identity of the user 108 and the mobile device 102 are verified. The client application 122 presents the account login page to cause the remote service 104 to open the user account 110, for example. The client application 122 causes the mobile device 102 to establish access to the remote service 104 by invoking a remote service that logs into the user account 110 associated with the user 108 of the mobile device 102.

FIG. 3e depicts aspects of the example GUI 300 in accordance with one or more implementations. The GUI 300 depicted in FIG. 3e presents an access denial page 314 to indicate that user and device authentication failed when the remote service reply 148 indicates that the identities of the user 108 and the mobile device 102 are unverifiable. The client application 122 presents the access denial page 314 to prevent or refrain from allowing access through the client application 122 to the remote service 104 to open or access the user account 110.

Figure 3F:
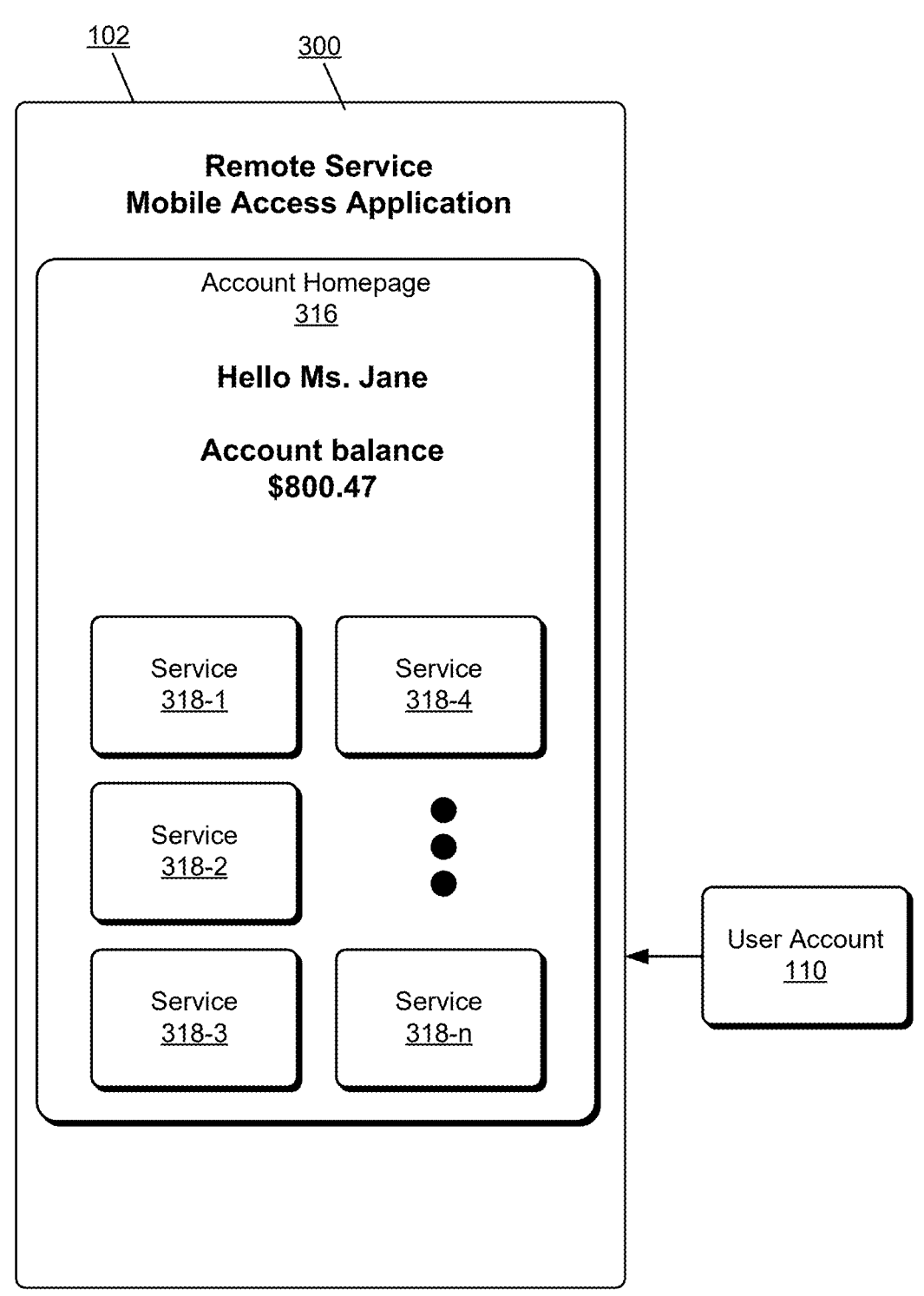
FIG. 3*f* depicts an example GUI in accordance with one or more implementations.

FIG. 3f depicts aspects of the example GUI 300 in accordance with one or more implementations. The GUI 300 depicted in FIG. 3f presents an account homepage 316 including a selectable elements 318-1 through 318-n (where n is any integer) to access various services provided by the remote service 104 when the remote service reply 148 indicates that the user identity and device identity of the user 108 and the mobile device 102 are verified. The client application 122 establishes a connection through the network 106 and presents the account homepage to enable user interactions with the remote service 104. The client application 122 causes the mobile device 102 to establish access to the remote service 104 by invoking a remote service that accesses the account homepage 316 of the user account 110 associated with the user 108 of the mobile device 102.

FIG. 4 illustrates a flow chart depicting an example method 400 for secure attestation based access to remote services in accordance with one or more implementations. Operations of the method 400, for instance, may be performed in the context of the environment 100, such as by the mobile device 102 and/or the remote service 104 to control the GUI 300 depicted in FIG. 3a through FIG. 3f.

At operation 402, a user input is received at the mobile device 102 to open a mobile application (e.g., the client application 122) for accessing the remote service 104. For example, the user 108 taps at a touchscreen input to select an application icon that causes the client application 122 to open and execute within the application execution environment 118, including to present the GUI 300 depicted in FIG. 3a.

At operation 404, user feedback to point a mobile camera in front of a user face is output. For example, the GUI 300 depicted in FIG. 3b is presented to the user 108 perform face authentication. At operation 406, if the user face is not detected the method 400 remains at the operation 404, and when the user face is detected, the operation 406 initiates the face authentication. At operation 408, face authentication is executed to verify user identity. For example, the face authenticator 130 generates the face image 136 and verifies the identity of the user 108. At operation 410, the face image 136 captured during the face authentication is retained. The face image 136 is maintained by the secure application 134, for instance. At operation 412, device identity is attested to obtain the device identifiers 138. The device identifiers 138 are output from the device attestor 132 in at least one example.

At operation 414, the face image 136 and the device identifiers 138 are sent with the access request 146 to the remote authenticator 114 of the remote service 104. In at least one example, the document evidence 128 is also sent to the remote authenticator 114 as part of the access request 146. At operation 416, the remote service reply 148 is received indicating whether the remote authenticator can verify the user and device identities based on the access request 146. For example, the client application determines whether the access request 146 is granted or denied based on the remote service reply 148.

At operation 418, access through the mobile application to the remote service is allowed or denied based on the remote service reply 148. For example, the client application 122 causes the GUI 300 depicted in FIG. 3*e* to display the access denial page 314 when the access is denied. The client application 122 causes the GUI 300 depicted in FIG. 3*d* to display the account login page. Next, the client application 122 causes the GUI 300 depicted in FIG. 3*f* to display the account homepage 316.

FIG. 5 illustrates a flow chart depicting an example method 500 for secure attestation based access to remote services in accordance with one or more implementations. Operations of the method 500, for instance, may be performed in the context of the environment 100, such as by the mobile device 102 and/or the remote service 104.

At operation 502, document evidence is obtained with an application processor for authorizing a user of a mobile device to access one or more remote services through a network. The client application 122, for instance, executes in the application execution environment 118 to obtain the document evidence 128 for verifying the user identity. The client application 122 controls a camera of the mobile device 102 to obtain images corresponding to the document evidence 128 (e.g., the user 108 holds the camera in front of paper documents, passports, drivers licenses, or other physical identification to generate digital scans of the physical items. In various implementations, the operation 502 is optional and the document evidence may not be collected. The remote authenticator 114 of the remote service 104 may not use the document evidence 128 for enabling the remote authentication of the user 108 and the mobile device 102.

At operation 504, a user identity is authenticated by a secure processor based on a plurality of images captured of a user face. For example, the secure application 134 executes in the trusted execution environment 120 collecting information for enabling remote authentication by the remote authenticator 114, in addition to locally authenticating the user and device identity of the user 108 and the mobile device 102. To perform the later, the secure application 134 causes the face authenticator 130 to authenticate the user identity by controlling the camera (e.g., the same camera used to scan the document evidence 128, a different camera of the mobile device 102) to capture the plurality of images. At least one of the images is used as the face image 136 for enabling the remote authentication, which may be based further on the document evidence 128.

At operation 506, a device identity is attested based on one or more device identifiers of the mobile device. For example, when the user identity is authenticated by the face authenticator 130, the secure application 134 invokes the device attestor 132 to perform a device attestation process, which may be similar to a process performed by the device attestor 132 during a mobile device startup sequence or part of booting the operating system of the mobile device 102. The device identifiers 138 are output from this process for enabling the remote authentication based further on the face image 136 and the document evidence 128.

At operation 508, a request for access to the remote services is sent by the secure processor and through the network based on the document evidence, at least one of the images, and the device identifiers. The secure application 134 generates the access request 146 to share information with the remote authenticator 114 to assist the client application 122 to establish access to the remote service 104. The secure application 134, for instance, sends the document evidence 128, the face image 136, and the device identifiers 138 through the service API 116 as part of the access request 146.

At operation 510, access through the network to the remote services is controlled by the application processor based on a remote service reply to the request for access sent to the remote services. For example, the remote authenticator 114 confirms the face authentication and the device attestation implemented by the secure application 134 successfully verified the user and device identity to allow access to the user account 110. Based on the user information 112 and the information received with the access request 146, the remote authenticator 114 performs remote authentication operations, including to compare the document evidence 128 or the face image 136 to reference images maintained in the user information 112 for verifying the user identity. Likewise, the remote authenticator 114 performs device authentication operations for verifying the device identity based on the device identifiers 138. The device identifiers 138 may be compared with reference device identifiers preserved in the user information 112 during part of the device authentication. The remote authenticator 114 sends the remote service reply 148 to the client application 122, which indicates whether the access request 146 is granted or denied. The access request 146 is granted, for example, when both the user identity and the device identity are verified to be locally and remotely authenticated.

At operation 512, the application processor refrains from accessing the remote services when the remote service reply indicates the request for access is denied. For example, the client application 122 outputs a message to the user 108 indicating the remote access is denied.

At operation 514, the application processor establishes access to the remote services when the remote service reply indicates that the request for access is allowed. For example, the client application 122 interacts with the remote service 104 to access the user account 110 with the remote service 104 (e.g., link the user account associated with the user 108 of the mobile device 102). The client application 122 displays an account login GUI. In at least one example, after the user account 110 is logged in, the client application 122 interacts with the remote service 104 to access the user account 110 associated with the user 108 of the mobile device 102. The client application 122 displays an account login GUI followed by an account homepage GUI, for example.

The example methods described above may be performed in various ways, such as for implementing different aspects of the systems and scenarios described herein. Any services, components, modules, methods, and/or operations described herein can be implemented using software, firmware, hardware (e.g., fixed logic circuitry), manual processing, or any combination thereof. Some operations of the example methods may be described in the context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 6:
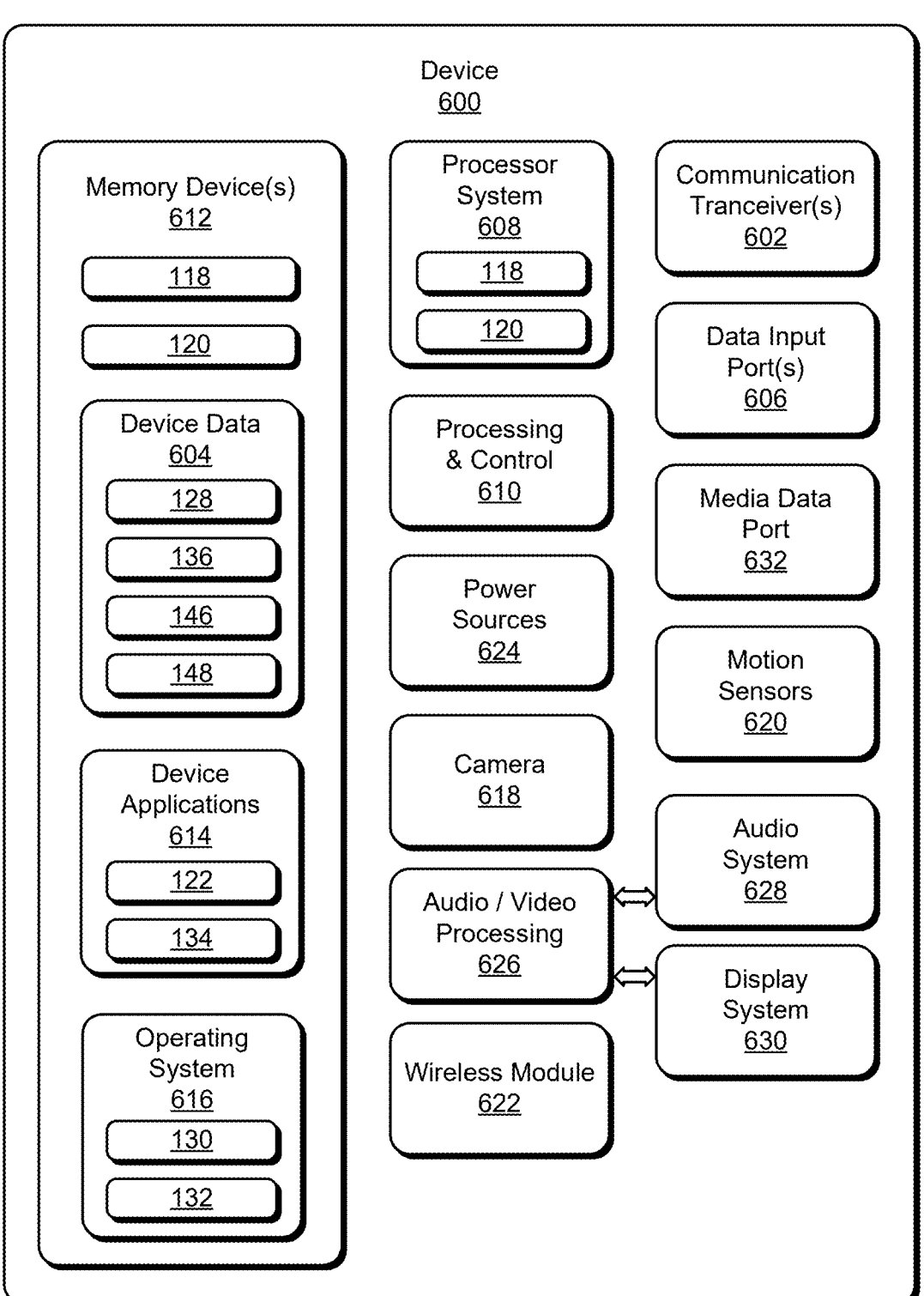
FIG. 6 illustrates various components of an example device in which aspects of secure attestation based access to remote services can be implemented in accordance with one or more implementations.

FIG. 6 illustrates various components of the example device 600 in which aspects of authentication for data transaction messages can be implemented. The example device 600 can be implemented as any of the devices described with reference to the previous FIGS. 1-5, such as any type of mobile device, mobile phone, mobile device, wearable device, tablet, computing, communication, enter-tainment, gaming, media playback, and/or other type of electronic device. For example, aspects of the mobile device 102 and/or the remote service 104 as shown and described with reference to FIGS. 1-5 may be implemented as the example device 600.

The device 600 includes communication transceivers 602 that enable wired and/or wireless communication of device data 604 with other devices. The device data 604 can include any of device identifying data, device location data, wireless connectivity data, and wireless protocol data. Additionally, the device data 604 can include any type of audio, video, and/or image data. For example, the device data 604 includes at least one of the document evidence 128, the face image 136, the device identifiers 138, or the user informa-tion 112. In at least one implementation, the device data 604 includes the access request 146. Example communication transceivers 602 include wireless personal area network (WPAN) radios compliant with various IEEE 802.15 (Blu-etooth™) standards, wireless local area network (WLAN) radios compliant with any of the various IEEE 802.10 (Wi-Fi™) standards, wireless wide area network (WWAN) radios for cellular phone communication, wireless metro-politan area network (WMAN) radios compliant with vari-ous IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded con-tent, and any other type of audio, video, and/or image data received from any content and/or data source. In at least one implementation, the data input ports 606 receive the remote service reply 148, which is stored with the device data 604. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, control-lers, and the like) and/or a processor and memory system implemented as a system-on-chip (SoC) that processes com-puter-executable instructions. For example, the processing system 608 includes a first processor, such as an application processor as described above to implement the application execution environment 118. The processing system 608 further includes a second processor, such as a secure pro-cessor as described above to implement the trusted execu-tion environment 120. The processor system may be imple-mented at least partially in hardware, which can include components of an integrated circuit or on-chip system, an application-specific integrated circuit (ASIC), a field-pro-grammable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data stor-age, such as data storage devices that can be accessed by a computing device, and that provide persistent storage of data and executable instructions (e.g., software applications, pro-grams, functions, and the like). Examples of the computer-readable storage memory 612 include volatile memory and non-volatile memory, fixed and removable media devices, and any suitable memory device or electronic data storage that maintains data for computing device access. The com-puter-readable storage memory 612 can include various implementations of random access memory (RAM), read-only memory (ROM), flash memory, and other types of storage media in various memory device configurations. The device 600 may also include a mass storage media device. The computer-readable storage memory 612 supports imple-mentation of the application execution environment 118 and the trusted execution environment 120. For example, the computer-readable storage memory 612 includes a first portion of addressable memory to execute the client appli-cation 122 using the application processor. A second portion of the addressable memory, isolated from the application execution environment 118 to configure the secure processor to execute the secure application 134 in the trusted execution environment 120. Computer-readable storage memory 612 represents media and/or devices that enable persistent and/or non-transitory storage of information in contrast to mere signal transmission, carrier waves, or signals per se. Com-puter-readable storage memory 612 do not include signals per se or transitory signals.

The computer-readable storage memory 612 provides data storage mechanisms to store the device data 604, other types of information and/or data, and various device appli-cations 614 (e.g., software applications). The device appli-cations 614 include the client application 122 and the secure application 134, for instance. As another example of device programs maintained in the computer-readable storage memory 612 include instructions for an operating system 616 including instructions for the face authenticator 130 and the device attestor 132. The instructions can be maintained as software instructions within the memory 612 and executed by the processing system 608. The device appli-cations 614 may also include a device manager, such as any form of a control application, software application, signal-processing and control module, code that is native to a particular device, a hardware abstraction layer for a particu-lar device, and so on.

In this example, the example device 600 also includes a camera 618 and motion sensors 620, such as may be implemented in an inertial measurement unit (IMU). The motion sensors 620 can be implemented with various sen-sors, such as a gyroscope, an accelerometer, and/or other types of motion sensors to sense motion of the device. The various motion sensors 620 may also be implemented as components of an inertial measurement unit in the device. The camera 618 is usable by the client application 122 to obtain the document evidence 128 and is also usable by the secure application 134 and the face authenticator 130 to capture images, including the face image 136 used verify the identity of the user 108. The motion sensors 620 are used as input devices, for example, to detect when the user 108 is holding the device 600 with the camera 618 pointed away or towards the user face. In response to detecting an intent of the user 108 to take a picture of the user face based on sensor data obtained from the motion sensors 620, the secure application 134 or the client application 122 trigger the face authenticator 130 to verify the user identity.

The device 600 also includes a wireless module 622, which is representative of functionality to perform various wireless communication tasks. For example, the secure application 134 communicates the access request 146 to the remote service 104 through a network connection established by the wireless module 622 to the network 106. The client application 122 receives the remote service reply 148 from the remote service 104 through a network connection established by the wireless module 622 to the network 106.

The device 600 can also include one or more power sources 624, such as when the device is implemented as a mobile device. The power sources 624 may include a charging and/or power system, and can be implemented as a flexible strip battery, a rechargeable battery, a charged super-capacitor, and/or any other type of active or passive power source.

The device 600 also includes an audio and/or video processing system 626 that generates audio data for an audio system 628 and/or generates display data for a display system 630. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 632. In implementations, the audio system and/or the display system are integrated components of the example device. Alternatively, the audio system and/or the display system are external, peripheral components to the example device.

Although implementations of secure attestation based access to remote services have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a mobile device, including: at least one memory, and at least one processor coupled with the at least one memory and configured to cause the mobile device to: execute at least one module at least partially within an application execution environment to cause the mobile device to: obtain document evidence for authorizing a user of the mobile device to access one or more remote services, and control access to the remote services based on a remote service reply to a request for access sent to the remote services, and execute the at least one module at least partially within a trusted execution environment to cause the mobile device to: authenticate a user identity based on a plurality of images captured from the trusted execution environment of a user face, attest a device identity based on one or more device identifiers of the mobile device, and send the request for access to the remote services based on the document evidence, at least one of the images, and the device identifiers.

In some aspects, the techniques described herein relate to a mobile device, wherein the application execution environment includes an application processor of the mobile device, and the trusted execution environment includes a secure processor of the mobile device.

In some aspects, the techniques described herein relate to a mobile device, wherein the document evidence includes one or more document images accessible from the application execution environment and the trusted execution environment, and the plurality of images including the at least one of the images is accessible from the trusted execution environment and not accessible from the application execution environment.

In some aspects, the techniques described herein relate to a mobile device, wherein the device identifiers are not accessible from the application execution environment.

In some aspects, the techniques described herein relate to a mobile device, wherein the request for access to the remote services is not accessible from the application execution environment.

In some aspects, the techniques described herein relate to a mobile device, wherein the at least one processor is configured to execute the at least one module partially within the application execution environment to cause the mobile device to control access to the remote services based on the remote service reply by: refraining from accessing the remote services when the remote service reply indicates the request for access is denied, and establishing access to the remote services when the remote service reply indicates that the request for access is allowed.

In some aspects, the techniques described herein relate to a mobile device, wherein the at least one processor is configured to execute the at least one module partially within the application execution environment to cause the mobile device to establish access to the remote services by invoking a first remote service that logs into a user account associated with the user of the mobile device.

In some aspects, the techniques described herein relate to a mobile device, wherein the at least one processor is configured to execute the at least one module partially within the application execution environment to cause the mobile device to establish access to the remote services by invoking a second remote service that accesses a homepage of the user account associated with the user of the mobile device.

In some aspects, the techniques described herein relate to a mobile device, wherein the at least one processor is configured to execute the at least one module partially within the application execution environment to cause the mobile device to control a camera of the mobile device from the application execution environment to obtain images corresponding to the document evidence.

In some aspects, the techniques described herein relate to a mobile device, wherein the at least one processor is configured to execute the at least one module partially within the trusted execution environment to cause the mobile device to control the camera of the mobile device from the trusted execution environment to capture the plurality of images.

In some aspects, the techniques described herein relate to a system including: at least one application processor configured to cause the system to: obtain document evidence for authorizing a user of the system to access one or more remote services, and control access through a network to the remote services based on a remote service reply to a request for access sent to the remote services, and at least one secure processor configured to cause the system to: authenticate a user identity based on a plurality of images captured of a user face, attest a device identity based on one or more device identifiers of the system, and send through the network the request for access to the remote services based on the document evidence, at least one of the images, and the device identifiers.

In some aspects, the techniques described herein relate to a system, wherein the document evidence is accessible to the application processor, and each of the device identifiers and the plurality of images including the at least one of the images is not accessible to the application processor.

In some aspects, the techniques described herein relate to a system, wherein the application processor is configured to cause the system to control access through the network to the remote services by: refraining from accessing the remote services when the remote service reply indicates the request for access is denied, and establishing access to the remote services when the remote service reply indicates that the request for access is allowed.

In some aspects, the techniques described herein relate to a system, wherein the application processor is configured to cause the system to establish access to the remote services by invoking at least one of: a first remote service that logs into a user account associated with the user of the system, or a second remote service that accesses a homepage of the user account associated with the user of the system.

In some aspects, the techniques described herein relate to a system, wherein: the application processor is configured to cause the system to control a camera to obtain images corresponding to the document evidence, and the secure processor is configured to cause the system to control the camera to capture the plurality of images.

In some aspects, the techniques described herein relate to a method, including: obtaining, by an application processor of a mobile device, document evidence for authorizing a user of the mobile device to access one or more remote services through a network, authenticating, by a secure processor of the mobile device, a user identity based on a plurality of images captured of a user face, attesting, by the secure processor, a device identity based on one or more device identifiers of the mobile device, sending, by the secure processor and through the network, a request for access to the remote services based on the document evidence, at least one of the images, and the device identifiers, and controlling, by the application processor, access through the network to the remote services based on a remote service reply to the request for access sent to the remote services.

In some aspects, the techniques described herein relate to a method, wherein the document evidence is accessible to the application processor, and each of the device identifiers and the plurality of images including the at least one of the images is not accessible to the application processor.

In some aspects, the techniques described herein relate to a method, wherein controlling access through the network to the remote services includes: refraining, by the application processor, from accessing the remote services when the remote service reply indicates the request for access is denied, and establishing, by the application processor, access to the remote services when the remote service reply indicates that the request for access is allowed.

In some aspects, the techniques described herein relate to a method, wherein establishing access to the remote services includes invoking at least one of: a first remote service that logs into a user account associated with the user of the mobile device, or a second remote service that that manages a homepage of the user account associated with the user of the mobile device.

In some aspects, the techniques described herein relate to a method, wherein: obtaining the document evidence includes controlling, by the application processor, a camera to obtain images corresponding to the document evidence, and authenticating the user identity includes controlling, by the secure processor, the camera to capture the plurality of images.

The invention claimed is:

1. A mobile device, comprising:
at least one memory; and
at least one processor coupled with the at least one memory and configured to cause the mobile device to:
execute at least one module at least partially within an application execution environment to cause the mobile device to:
obtain document evidence for authorizing a user of the mobile device to access one or more remote services; and
control access to the remote services based on a remote service reply to a request for access sent to the remote services; and
execute the at least one module at least partially within a trusted execution environment to cause the mobile device to:
authenticate a user identity based on a plurality of images captured from the trusted execution environment of a user face;
attest a device identity based on one or more device identifiers of the mobile device; and
send the request for access to the remote services based on the document evidence, at least one of the images, and the device identifiers.

2. The mobile device of claim 1, wherein the application execution environment includes an application processor of the mobile device, and the trusted execution environment includes a secure processor of the mobile device.

3. The mobile device of claim 1, wherein the document evidence includes one or more document images accessible from the application execution environment and the trusted execution environment, and the plurality of images including the at least one of the images is accessible from the trusted execution environment and not accessible from the application execution environment.

4. The mobile device of claim 1, wherein the device identifiers are not accessible from the application execution environment.

5. The mobile device of claim 1, wherein the request for access to the remote services is not accessible from the application execution environment.

6. The mobile device of claim 1, wherein the at least one processor is configured to execute the at least one module partially within the application execution environment to cause the mobile device to control access to the remote services based on the remote service reply by:
refraining from accessing the remote services when the remote service reply indicates the request for access is denied; and
establishing access to the remote services when the remote service reply indicates that the request for access is allowed.

7. The mobile device of claim 6, wherein the at least one processor is configured to execute the at least one module partially within the application execution environment to cause the mobile device to establish access to the remote services by invoking a first remote service that logs into a user account associated with the user of the mobile device.

8. The mobile device of claim 7, wherein the at least one processor is configured to execute the at least one module partially within the application execution environment to cause the mobile device to establish access to the remote services by invoking a second remote service that accesses a homepage of the user account associated with the user of the mobile device.

9. The mobile device of claim 1, wherein the at least one processor is configured to execute the at least one module partially within the application execution environment to cause the mobile device to control a camera of the mobile device from the application execution environment to obtain images corresponding to the document evidence.

10. The mobile device of claim 9, wherein the at least one processor is configured to execute the at least one module partially within the trusted execution environment to cause the mobile device to control the camera of the mobile device from the trusted execution environment to capture the plurality of images.

11. A system comprising:

at least one application processor configured to cause the system to:

obtain document evidence for authorizing a user of the system to access one or more remote services; and control access through a network to the remote services based on a remote service reply to a request for access sent to the remote services; and at least one secure processor configured to cause the system to:

authenticate a user identity based on a plurality of images captured of a user face;

attest a device identity based on one or more device identifiers of the system; and send through the network the request for access to the remote services based on the document evidence, at least one of the images, and the device identifiers.

12. The system of claim 11, wherein the document evidence is accessible to the application processor, and each of the device identifiers and the plurality of images including the at least one of the images is not accessible to the application processor.

13. The system of claim 11, wherein the application processor is configured to cause the system to control access through the network to the remote services by:

refraining from accessing the remote services when the remote service reply indicates the request for access is denied; and establishing access to the remote services when the remote service reply indicates that the request for access is allowed.

14. The system of claim 13, wherein the application processor is configured to cause the system to establish access to the remote services by invoking at least one of:

a first remote service that logs into a user account associated with the user of the system; or a second remote service that accesses a homepage of the user account associated with the user of the system.

15. The system of claim 11, wherein:

the application processor is configured to cause the system to control a camera to obtain images corresponding to the document evidence; and the secure processor is configured to cause the system to control the camera to capture the plurality of images.

16. A method, comprising:

obtaining, by an application processor of a mobile device, document evidence for authorizing a user of the mobile device to access one or more remote services through a network;

authenticating, by a secure processor of the mobile device, a user identity based on a plurality of images captured of a user face;

attesting, by the secure processor, a device identity based on one or more device identifiers of the mobile device;

sending, by the secure processor and through the network, a request for access to the remote services based on the document evidence, at least one of the images, and the device identifiers; and controlling, by the application processor, access through the network to the remote services based on a remote service reply to the request for access sent to the remote services.

17. The method of claim 16, wherein the document evidence is accessible to the application processor, and each of the device identifiers and the plurality of images including the at least one of the images is not accessible to the application processor.

18. The method of claim 16, wherein controlling access through the network to the remote services comprises:

refraining, by the application processor, from accessing the remote services when the remote service reply indicates the request for access is denied; and establishing, by the application processor, access to the remote services when the remote service reply indicates that the request for access is allowed.

19. The method of claim 18, wherein establishing access to the remote services includes invoking at least one of:

a first remote service that logs into a user account associated with the user of the mobile device; or a second remote service that that manages a homepage of the user account associated with the user of the mobile device.

20. The method of claim 16, wherein:

obtaining the document evidence includes controlling, by the application processor, a camera to obtain images corresponding to the document evidence; and authenticating the user identity includes controlling, by the secure processor, the camera to capture the plurality of images.

* * * * *